US011733050B2

(12) United States Patent
Beaurepaire et al.

(10) Patent No.: US 11,733,050 B2
(45) Date of Patent: Aug. 22, 2023

(54) METHOD AND APPARATUS FOR PROVIDING AN ISOLINE MAP OF A TIME TO PARK AT A DESTINATION

(71) Applicant: HERE GLOBAL B.V., Eindhoven (NL)

(72) Inventors: Jerome Beaurepaire, Berlin (DE); Jens Unger, Berlin (DE)

(73) Assignee: HERE Global B.V., Eindhoven (NL)

( * ) Notice: Subject to any disclaimer, the term of this patent is extended or adjusted under 35 U.S.C. 154(b) by 670 days.

(21) Appl. No.: 16/448,943

(22) Filed: Jun. 21, 2019

(65) Prior Publication Data
US 2020/0400446 A1 Dec. 24, 2020

(51) Int. Cl.
*G01C 21/34* (2006.01)
*G08G 1/14* (2006.01)

(52) U.S. Cl.
CPC ..... *G01C 21/3423* (2013.01); *G01C 21/3415* (2013.01); *G01C 21/3438* (2013.01); *G01C 21/3492* (2013.01); *G08G 1/141* (2013.01)

(58) Field of Classification Search
None
See application file for complete search history.

(56) References Cited

U.S. PATENT DOCUMENTS

| 6,421,606 | B1 * | 7/2002 | Asai | G01C 21/3688 |
| | | | | 701/410 |
| 9,035,799 | B2 * | 5/2015 | Love | G08G 1/146 |
| | | | | 340/932.2 |
| 9,958,280 | B2 | 5/2018 | Scofield et al. | |
| 2016/0334235 | A1 * | 11/2016 | Gustafson | G01C 21/3492 |
| 2017/0191849 | A1 | 7/2017 | Agam et al. | |
| 2018/0336784 | A1 * | 11/2018 | Liu | G08G 1/096838 |

OTHER PUBLICATIONS

Jean et al., "A Winning Strategy to Park", ITS World Congress 2017 Montreal, Oct. 29-Nov. 2. https://jsgonsette.github.io/PaperITS2017.pdf, pp. 1-8. (Year: 2017).*
Jean et al., "A Winning Strategy to Park", ITS World Congress 2017 Montreal, Oct. 29-Nov. 2, retrieved on Jun. 12, 2019 from https://jsgonsette.github.io/PaperITS2017.pdf, pp. 1-8.
Maria et al., "Modelling Travel Time in Urban Networks: Comparable Measures for Private Car and Public Transport", published in Journal of Transport Geography, vol. 31, Jul. 2013, pp. 143-153.

* cited by examiner

*Primary Examiner* — Christian Chace
*Assistant Examiner* — Katherine Marie Fitzharris
(74) *Attorney, Agent, or Firm* — Ditthavong, Steiner & Mlotkowski

(57) ABSTRACT

An approach is provided for providing an isoline map of a time to park at a destination. A routing platform computes the time to park at a destination of a navigation route, wherein the time to park represents an estimated time that is needed for a vehicle to park within a geographic area surrounding the destination. The routing platform further determines an isoline that delineates a boundary of the geographic area, wherein the isoline indicates an extent of the geographic area in which the time to park applies. The routing platform further provide data to generate a user interface depicting a representation of the isoline in the time to park isoline map.

17 Claims, 15 Drawing Sheets

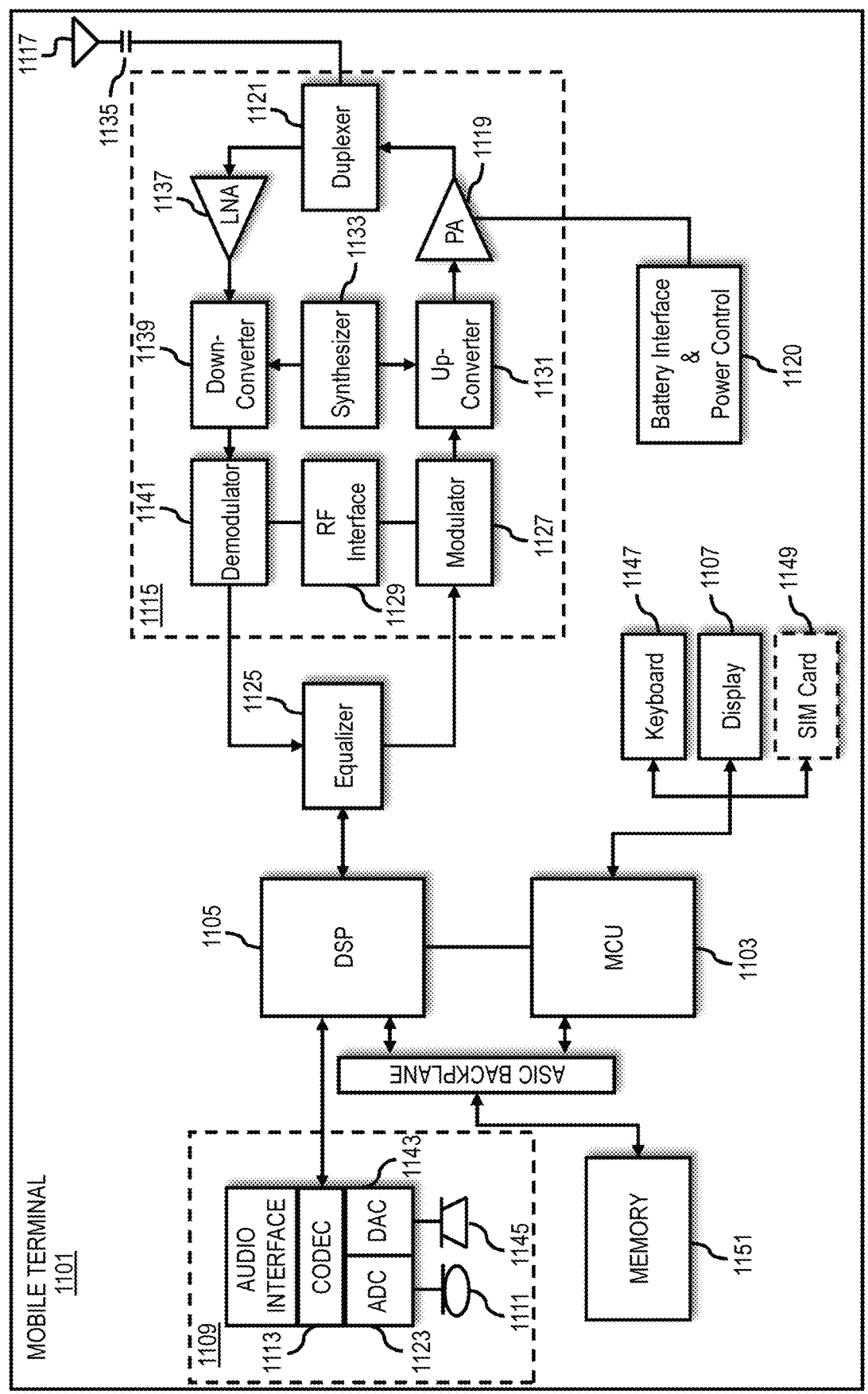

METHOD AND APPARATUS FOR PROVIDING AN ISOLINE MAP OF A TIME TO PARK AT A DESTINATION

BACKGROUND

Service providers and automobile manufacturers are continually challenged to deliver value and convenience to consumers by, for example, providing compelling navigation services. One area of development relates to surfacing relevant transportation options available to end users, particularly as the variety of transportation options (e.g., personal vehicles, public transport, shared vehicles, walking, etc.) increases. In some cases, different combinations of these transportation can be used in an intermodal route (e.g., a route with different legs using different modes of transport), thereby further increasing complexity when planning a route. Therefore, service providers face significant technical challenges to selecting and presenting information that can help end user decide among the available transportation options to complete a journey more efficiently. For example, one common scenario involves determining when a vehicle route or journey to a destination can be improved by parking the vehicle and continuing to the destination using another transport mode versus continuing the vehicle journey to the destination and parking there.

SOME EXAMPLE EMBODIMENTS

Therefore, there is a need for an approach for providing an isoline map of a time to park at a destination that visualizes where and when to park and transfer to alternate mode of transport.

According to one embodiment, a method comprises computing the time to park at a destination of a navigation route, wherein the time to park represents an estimated time that is needed for a vehicle to park within a geographic area surrounding the destination. The method also comprises determining an isoline that delineates a boundary of the geographic area, wherein the isoline indicates an extent of the geographic area in which the time to park applies. The method further comprises providing data to generate a user interface depicting a representation of the isoline with respect to the destination in the isoline map.

According to another embodiment, an apparatus comprises at least one processor, and at least one memory including computer program code for one or more computer programs, the at least one memory and the computer program code configured to, with the at least one processor, compute the time to park at a destination of a navigation route, wherein the time to park represents an estimated time that is needed for a vehicle to park within a geographic area surrounding the destination. The apparatus is also caused to determine an isoline that delineates a boundary of the geographic area, wherein the isoline indicates an extent of the geographic area in which the time to park applies. The apparatus is further caused to provide data to generate a user interface depicting a representation of the isoline with respect to the destination in the isoline map.

According to another embodiment, a computer-readable storage medium carries one or more sequences of one or more instructions which, when executed by one or more processors, cause, at least in part, an apparatus to compute the time to park at a destination of a navigation route, wherein the time to park represents an estimated time that is needed for a vehicle to park within a geographic area surrounding the destination. The apparatus is also caused to determine an isoline that delineates a boundary of the geographic area, wherein the isoline indicates an extent of the geographic area in which the time to park applies. The apparatus is further caused to provide data to generate a user interface depicting a representation of the isoline with respect to the destination in the isoline map.

According to another embodiment, an apparatus comprises means for computing the time to park at a destination of a navigation route, wherein the time to park represents an estimated time that is needed for a vehicle to park within a geographic area surrounding the destination. The apparatus also comprises means for determining an isoline that delineates a boundary of the geographic area, wherein the isoline indicates an extent of the geographic area in which the time to park applies. The apparatus further comprises means for providing data to generate a user interface depicting a representation of the isoline with respect to the destination in the isoline map.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 11 is a diagram of a mobile terminal (e.g., handset or drone or part thereof) that can be used to implement an embodiment.

DESCRIPTION OF SOME EMBODIMENTS

Examples of a method, apparatus, and computer program for providing an isoline map of a time to park at a destination are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
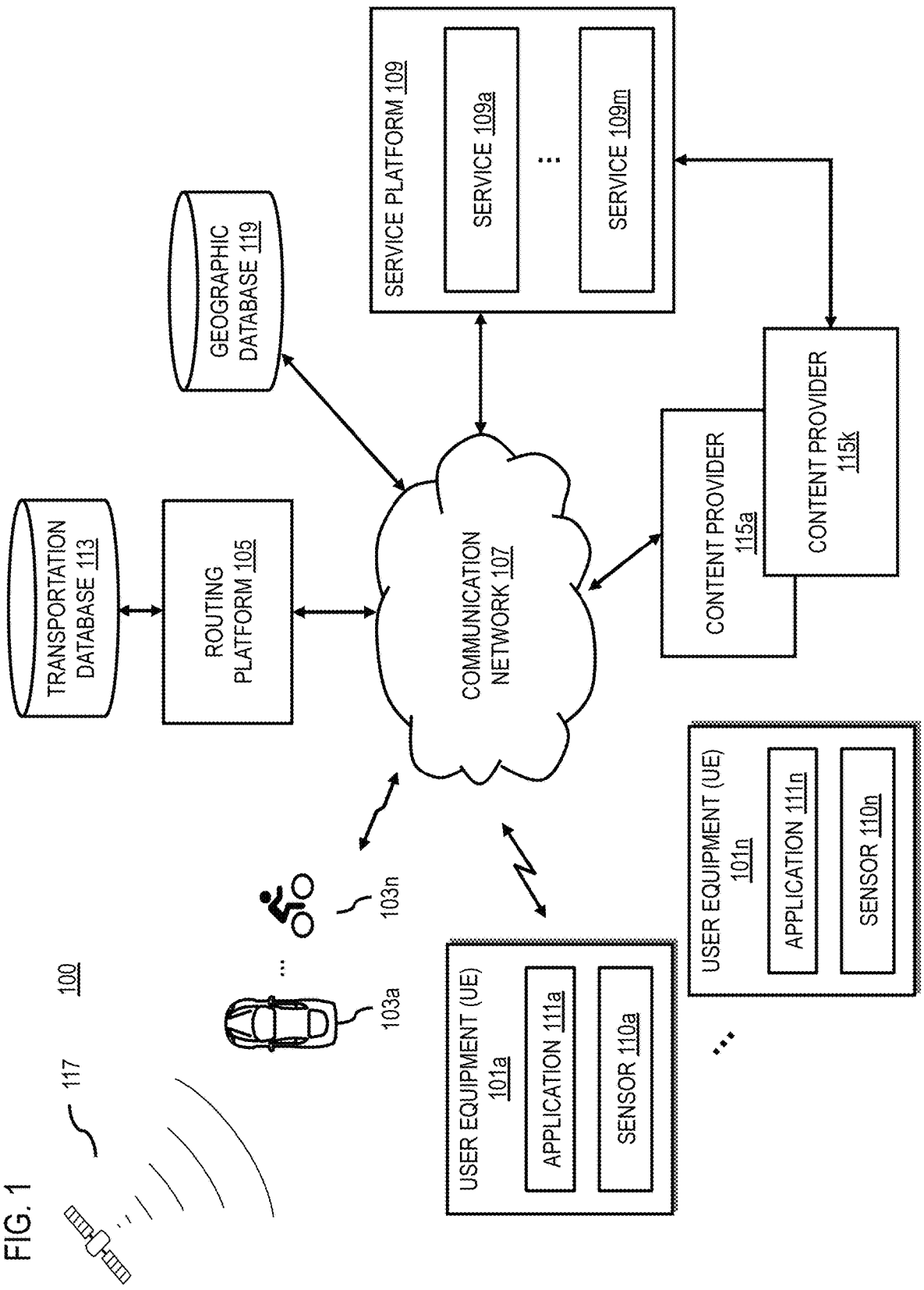
FIG. 1 is a diagram of a system for providing an isoline map of a time to park at a destination, according to one embodiment.

FIG. 1 is a diagram of a system for providing an isoline map of a time to park at a destination, according to one embodiment. As discussed above, determining and conveying to a user where and when to park the car and continue by an alternate transport mode (e.g., public, private or shared autonomous vehicles, etc.), rather than driving until reaching the destination is technically challenging. This decision can be a complex one for an end user to make because it often entails digesting and comparing a variety of routing parameters. In many cases, the user may have to make this decision after already starting a route to a destination because many of the routing parameters that are to be considered (e.g., parking availability, traffic, availability of other transport modes, availability of shared vehicles at specific locations, etc.) are dynamic and can often change in real time. In other words, the locations, availability, service areas, range, etc. of shared vehicles or other modes of transport can be very volatile and can therefore make knowing when and what transport options are available near a parking location much more complex and difficult. For example, when starting a route using a car, the user is already facing the cognitive load associated with driving safety and should spare as little cognitive capacity as possible to ingest and evaluate transport options on the fly. In addition, the large numbers of available shared vehicles and/or corresponding providers of the shared vehicles (e.g., mobility providers) within a given area can also make visualizing the timing and options of parking then transferring to an alternate mode of transport difficult.

To address this problem, a system 100 of FIG. 1 introduces a capability to provide an isoline map of a Time to Park (TtP) at a destination to enable users to quickly visualize the TtP. The TtP is an example of one routing parameter that can be used be a driver or other end user to decide on whether continue by vehicle to a destination and park, or whether the driver should park earlier and find an alternate transport mode (e.g., a shared vehicle such as scooter or bicycle) to the destination. For example, if the TtP is high (e.g., greater than a threshold value) or increasing near a destination, the user may be encouraged to look for an alternate transport mode that does not require parking near the destination. On the other hand, if the TtP is low (e.g., less than a threshold value) or decreasing, the driver may be encouraged to continue to the destination by vehicle and park near the destination. In one embodiment, the system 100 uses the TtP to create a mapping user interface or display presenting an isoline around a driver's destination such that the isoline delineates the geographic area around destination in which the TtP is applicable. In this way, the user or driver can easily identify a destination and the TtP around that destination at a glance, even when driving or performing other tasks.

Generally, a time to the destination is based on a travel time to a geographic area surrounding the destination, the TtP, and a time from a parking space to the destination by walking or via at least one more alternate mode of transport. In one embodiment, the TtP is an average time for a driver to find a parking space within a geographic area surrounding the destination. For some areas, the TtP varies depending on the time of a day, the day during a week, special events, different seasons, etc. For example, parking at a financial center is harder during morning and afternoon traffic hours, while it is easier to park during weekends. For some other areas, the TtP remains about the same most time of the year, such as at a small town center.

Various approaches can be used to estimate how long it will take a user to park at within a geographic area surrounding the destination. In one embodiment, the system 100 uses historical data to calculate, e.g., how long it averagely takes a user at this time of the day to find and park at a parking space within a geographic area surrounding the destination.

In another embodiment, the system 100 uses real-time parking information (e.g., park in/out event data streaming from the parking facility lot owner servers and/or clouds), related metrics like a churn rate per street, etc., to calculate an average time to find and park at a park space within a geographic area surrounding the destination. The real-time parking information includes off-street parking spots number and locations and/or on-street parking spots number and locations which availability varies with time.

In one embodiment, the system 100 uses off-street and/or on-street parking prediction models to estimate off-street parking spots number and locations and/or on-street parking spots number and locations.

In one embodiment, the system 100 retrieves the parking information from existing parking assistance systems that provide parking availability prediction services. The parking assistance systems may employ prediction models to render predictions on availability of parking spots for each road and/or road segment within a geographical area. In another embodiment, the system 100 determines the parking information via applying exiting parking availability prediction algorithms on modes of transport trajectory data.

In one embodiment, the system 100 provides recommendations on parking locations dynamically based on availability of alternate modes of transport in or nearby a geographic area surrounding the destination, to leverage an increased number of shared vehicles the geographic area and to combine different modes of transport dynamically as intermodal solutions to the user to get to the destination.

In another embodiment, the system 100 optimizes the time to park isoline computations through probabilistic approaches (e.g., by predicting the available of parking spaces that can affect the extent represented by the isoline).

In another embodiment, the system 100 uses traffic information to calculate an average time to find and park at a parking space within a geographic area surrounding the destination. In another embodiment, the system 100 computes the number of cars looking for a parking space within a geographic area surrounding the destination, such as the numbers of user in a parking search mode. By way of example, the system 100 determines that a user is in a parking search mode based on parking search behaviors, such as driving at lower speed than average next to a parked lane, going "in circles" around a central point, i.e., the destination, etc.

The parking spaces may span any geographic boundary (e.g., neighborhoods, cities, regions, etc.) that include a variety of road segments or other parking facilities. The parking spaces may be free parking spaces, metered parking spaces, time restricted parking spaces, temporary stopping spaces, temporary pick-up and drop-off zones, etc. A road may be any connecting pathway including but not limited to a roadway, a highway, a freeway, an expressway, a lane, a street path, a road, an alley, a controlled access roadway, a free access roadway, and the like.

In one embodiment, the system 100 determines that the time to park at the destination is increasing or decreasing over a monitored time period, and updates the representation of the isoline in the isoline map to indicate the increasing or the decreasing of the time to park. By way of example, the system 100 grows the isoline (e.g., 15 minutes to park a car) in the isoline map to indicate the increasing of the time to park, e.g., a bigger area around a water front dinning district requires 15-minute to park a car during lunch time. As another example, the system 100 shrinks the isoline (e.g., 15 minutes to park a car) in the isoline map to indicate the decreasing of the time to park, e.g., a smaller area around a school zone requires 15-minute to park a car after 6 pm.

Once a TtP threshold (e.g., 15 minutes) is reached, the system 100 starts looking for route alternatives (e.g. intermodal routes) to leverage the mobility hubs. In one embodiment, the TtP threshold is set by the system 100. In another embodiment, the TtP threshold is triggered by the user on demand. In yet another embodiment, the TtP threshold is a relative value of an averaged TtP for a given area, e.g., twice the average time to park in this area.

In one embodiment, the system 100 initiates a computation or a presentation of an alternate mode of transport, an alternate route, or a combination thereof based on determining that the time to park at the destination is increasing over a monitored time period. In this embodiment, the computation or the presentation of the alternate mode of transport is initiated based on determining that the time to park has increased to a threshold value, such as 15-minutes. In one embodiment, the alternate mode of transport includes a shared vehicle, a public transport, or a combination thereof. In another embodiment, the alternate mode of transport is associated with a mobility hub. In one embodiment, a mobility hub may be an aggregation of shared vehicles at a location in a geographical region, which supports intermodal navigation. In another embodiment, a mobility hub is an area where a user can find parking spaces easily (on street parking or off-street) and then quickly transfer to a shared vehicle.

In one embodiment, the system 100 visualizes where and when to park and recommends a transfer to an alternate mode of transport at a parking space in the isoline map.

In another embodiment, the system 100 initiates a presentation of a recommendation to continue to the destination to find a parking space based on determining that the time to park at the destination is decreasing over a monitored time period.

The system 100 optimizes a user's travel time (or route or other routing cost function parameter such as distance, fuel efficiency, etc.) to the destination by considering all possible modes of transport (e.g., public transport buses, trains, shared vehicles, etc.) connecting the parking space and the destination. In one embodiment, the system 100 computes the alternate route by making real-time computations of all possible combinations of available modes of transport combinations connecting the parking space and the destination. In one embodiment, the system 100 uses a probabilistic approach to predict the availability of the alternate modes of transport that are predicted to be available when a user is predicted to reach the parking space. In other words, a key question answered by the system 100 for a user according to one embodiment is: "when and where is it better to park the car and continue by another transport mode, rather than driving until the destination is reached and park there?"

In one embodiment, the system 100 responds to this question by presenting an isoline map of a time to park at a destination on a user interface depicting a trend/evolution of the isoline in connection with nearby available alternate modes of transport from a parking space to the destination. By way of example, the alternate mode of transport may be located within a distance of 50 meters from a suggested parking space. As another example, the alternate mode of transport and the parking space are located in the same mobility hub.

In another embodiment, the system 100 uses two-dimensional isoline routing, dynamic (or real time) traffic monitoring and timing adjustments to identify optimal intermodal routes to a destination. Optimal, for instance, refers to riding locations that enable the user and/or a respective vehicle to reach a destination of the route with a time, distance, etc. that meets threshold requirements or is a minimum among calculated candidate routes and/or locations.

In one embodiment, the system 100 can determine transport availability information (e.g., either the availability of transport modes or the unavailability of transport modes) based on static transport schedule data, and/or real-time transport tracking data. By way of example, the transport modes may include a public transit mode, a pedestrian mode, a bicycling mode, a shared vehicle, etc. A shared vehicle may be a car, a motorcycle, an electric bike, an electric scooter, a bicycle, a boat, etc. owned by an individual, a commercial business, a public agency, a cooperative, or an ad hoc grouping. In another embodiment, the system 100 optimizes the intermodal availability computations through probabilistic approaches (e.g., by predicting the availability of shared vehicles that can be used by a user near a parking space). Availability of shared vehicles can also be customized based on the mobility providers preferred by a user or for which the user has an account, and/or based on any other selecting criteria or setting.

The initial mode of transport (e.g., car, motorcycle, etc.) can be human-operated, semi-autonomous, or autonomous. In one embodiment, the user owns a human-operated or semi-autonomous vehicle and operates the vehicle to a parking space, and then transfers to an alternate mode of transport to the destination. In another embodiment, the user owns an autonomous vehicle which operates autonomously directly to the destination with the knowledge of the parking constraints around the destination, and then drive itself to a parking space based on the knowledge and waits for the user. Some examples of the parking constraints in an area around the destination are EV only zone, diesel exclusion zone, no parking zone, no car zone, park zone, an even number license only zone, etc.

The alternate modes of transport (e.g., buses, cars, motorcycles, electric bikes, electric scooters, bicycles, boats, airplanes, etc.) can also be human-operated, semi-autonomous, or autonomous, yet can circumvent the parking constraints around the destination.

In another embodiment, the initial and alternate modes of transport may be owned by an individual, a business entity, a public entity, etc. These embodiments are applicable to a driverless taxi, centralized ride-sharing, peer-to-peer ride-sharing, car-pooling, taxi cabs, food delivery, etc.

In one embodiment, to avoid cluttering the user interface, the system 100 selectively presents to the user the alternate modes of transport, the isolines and the isoline map based on user interactions. For example, in many cases, multiple shared vehicles can be available to a user to reach the destination. Rendering all of the available options in a user interface can overwhelm a user, make it difficult for a user to identify a specific mode of transport that is to be taken and its effect on the estimate time of arrival (ETA), etc. As a result, the system 100 can enable a user to select specific modes of transport, mobility providers, etc. The system can then compute and render the mode of transport and ETA based on the user's selection. For instance, in an example use case, the system 100 can direct a user to take a subway next to the parking space to the destination. In one example, the system 100 presents time to park isoline(s) originated from the destination, and updates the representation of the isoline in the isoline map to indicate the increasing or the decreasing of the time to park in conjunction with one or more candidate modes of transport that are near available parking spaces, connect to the destination, and/or meet one or more contextual limitations required by the system 100, the user, or a combination thereof (e.g., user having heavy load to carry), without cluttering the user interface. Once the user selects a parking space and/or the adjacent available mode of transport, the system 100 presents an intermodal route comprising an initial mode of transport segment and an alternate mode of transport segment in the isoline map on the user interface. The system 100 proactively reserves the alternate mode of transport for the user at or near the parking location once the user or users accept the suggestion.

In one embodiment, the system 100 includes one or more processes for automatically determining if and when a user may need intermodal routing including parking a vehicle in order to reach a destination, and providing parking and alternate mode of transport suggestions and guidance to the user to reach the destination faster and/or cheaper according to the embodiments described herein. In one embodiment, the system 100 receives a user request for an intermodal route to a destination. In another embodiment, the system 100 detects a user travel pattern/habit (such as a mobility behavior data model or matrix) and predicts the user's need for an intermodal route to a destination. In yet another embodiment, the system 100 detects the user's need for an intermodal route to a destination from an entry in the user's calendar, a social media event accepted or signed up by the user, an event in the user's massage (e.g., email, text message, instant message, SMS message, MMS message, etc.).

In one embodiment, UEs 101a-101n of a user and sensors in a vehicle 103a-103n are collecting and reporting data (e.g., location data) to the system 100 to support the determination and visualization of the time to park isoline map according to the embodiments described herein. In this way, for instance, vehicles 103a-103n and/or vehicle users can use the system for sharing trajectory data and receiving parking spaces and/or modes of transport supply and demand information as well as contextual data (e.g., traffic, weather conditions, etc.) that can be used to dynamically update the time to park isoline map. With this data along with other data such as but not limited to public transport information, the system 100 (e.g., a routing platform 105) can compute time to park isolines and candidate intermodal routes to a destination. In this way, the system 100 can more precisely present to the user the isoline map. In one embodiment, the UEs 101a-101n and the routing platform 105 have connectivity via a communication network 107.

In one embodiment, the vehicles 103a-103n are equipped with a device (e.g., the UE 101a-101n or other accessory device) that records the vehicles' trajectory data (e.g., position, speed, etc.). In one embodiment, the UE 101a-101n may be configured with one or more sensors 110a-110n (also collectively referred to as sensors) for determining the trajectory data (including parking locations). By way of example, the sensors 101a-101n may include location sensors (e.g., GPS), accelerometers, compass sensors, gyroscopes, altimeters, etc.

In one embodiment, after a journey or the trajectory data is recorded (e.g., upon parking), the trajectory data is analyzed (e.g., by respective applications 111a-111n and/or the routing platform 105 for storage in, for instance, a transportation database 113 and/or a geographic database 119) to determine parking spaces and to provide an isoline map at a destination. In one embodiment, timestamp information indicating at which time and which location the vehicle was parked is recorded as a record in the transportation database 113. In one embodiment, the record is then transmitted or uploaded to the routing platform 105. In addition or alternatively, the raw trajectory data may be uploaded to the routing platform 105 to determine the record. In yet another embodiment, the record and/or trajectory data may be maintained at the UE 101a-101n device for local processing to determine intermodal routes and to provide an isoline map of a time to park at a destination for transmission to the routing platform 105 and/or other vehicles/UEs 101a-101n (e.g., when operating in a peer-to-peer network architecture).

In one embodiment, when the UE 101a-101n requests a navigation route to ride a vehicle 103a-103n to a destination, the routing platform 105 computes time to park isoline(s) based on the destination and determine whether to recommend the user to park the vehicle and ride an alternate mode of transport based on the real-time updates of the time to park isoline(s), based on data from the transportation database 113 and/or the geographic database 119. The alternate transport mode may include a bicycle, a motorbike, a taxi, a bus, a subway, or other shared vehicles.

In one embodiments, the routing platform 105 ranks of available parking spaces based on, a distance between a parking space and an adjacent mode of transport, a likelihood of the adjacent mode of transport is available for the user, an estimation of time of arrival at a destination of the user, user preferences for parking spaces and/or modes of transport, user context (e.g., carrying heavy load), etc., and recommends parking space(s) based on the ranking.

In one embodiment, the routing platform 105 computes a segment for the user to get to the parking space using an initial mode of transport, assuming there is no delay of the estimated arrival time. In another embodiment, the routing platform 105 computes a segment for the user to get to the parking space using the initial mode of transport, when detecting there is traffic and/or weather delay of the estimated arrival time, and updates the recommendation of parking the vehicle and riding an alternate mode of transport accordingly.

In one embodiment, the routing platform 105 uses the time to park isoline to surface alternative routes for users through shared vehicles cluster (such as mobility hubs).

In one embodiment, the routing platform 105 is configured to monitor the user and the vehicle in order to generate travel status information and to calculate a respective probability for the modes of transport with respect to an expected time or time frame to reach the destination. In addition, the routing platform 105 may present to the user a real-time status of the initial mode of transport, an estimated or predicted status, and/or the probability of the initial mode of transport to arrive at the parking space with respect to an expected time or time frame to reach the destination. The status information may also be associated with timestamp information, the respective probability, and/or other contextual information (including parking) to store in the transportation database 113.

In one embodiment, the routing platform 105 may present to the user information on points of interest, parking areas, road segments, and/or related information retrieved from the geographic database 119, while the user is traveling on the transport mode segment. In addition or alternatively, such information can be provided by the service platform 109, one or more services 109a-109m (also collectively referred to as services 109), one or more content providers 115a-115k (also collectively referred to as content providers), or a combination thereof. For example, the sources of the information may include map data, information inferred from data collected from participating modes of transport, or a combination thereof.

In one embodiment, when a vehicle 103a-103n requests instructions to find a parking space at or near the alternate mode of transport, the routing platform 105 computes a route to the parking space, assuming there is no delay of the estimated arrival time of the alternate mode of transport. In another embodiment, the routing platform 105 computes a route to the parking space, when detecting there is traffic and/or weather delay of the estimated arrival time of the alternate mode of transport.

In one embodiment, the routing platform 105 updates the time to park isoline map and the recommendation to park and ride based on, for instance, timestamps, a number of transport modes available, and fluctuations in the amount of transport modes, etc. around the parking space (e.g., a transport hub), based on real-time transport data from the transportation database 113.

In one embodiment, vehicles 103a-103n are equipped with a navigation device (e.g., a UE 101a-101n) that is capable of submitting to the routing platform 105 requests for routing the vehicle and guiding the user respectively. In one embodiment, as the vehicle and the user follow the respective segments, the vehicle 103a-103n and the UE 101a-101n (e.g., via a navigation application 111a-111n) may iterate their locations with timestamps to the routing platform 105 in order to update the travel status in a real-time and/or substantially real-time manner while factoring in delay caused by traffic, weather, etc.

As shown in FIG. 1, the routing platform 105 operates in connection with UEs 101a-101n and vehicles 103a-103n for providing an isoline map of a time to park at a destination. By way of example, the UEs 101a-101n may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system. Also, the UEs 101a-101n may be configured to access a communication network 107 by way of any known or still developing communication protocols. Via this communication network 107, the UE 101a-101n may transmit probe data as well as access various network based services for facilitating providing an isoline map of a time to park at a destination.

Also, the UEs 101a-101n may be configured with navigation applications 111a-111n for interacting with one or more content providers 115a-115k, services of the service platform 109, or a combination thereof. Per these services, the navigation applications 111a-101n of the UE 101a-101n may acquire routing instructions, transport mode information, traffic information, mapping information and other data associated with the current locations of the user and the vehicle, etc. Hence, the content providers 115a-115k and service platform 109 may rely upon the gathering of user, vehicle, and transport modes trajectory data and routing data for executing the aforementioned services.

The UEs 101a-101n and the vehicles 103a-103n may be configured with various sensors 110a-110n for acquiring and/or generating trajectory data regarding the user, a vehicle, other vehicles, conditions regarding the driving environment or roadway, etc. For example, sensors 110a-110n may be used as GPS receivers for interacting with one or more satellites 117 to determine and track the current speed, position and location of a user and/or a vehicle travelling along a roadway. In addition, the sensors 110a-110n may gather tilt data (e.g., a degree of incline or decline of the vehicle during travel), motion data, light data, sound data, image data, weather data, temporal data and other data associated with UEs 101a-101n and/or the vehicle 103a-103n thereof. Still further, the sensors 110a-110n may detect local or transient network and/or wireless signals, such as those transmitted by nearby devices during navigation of a vehicle along a roadway. This may include, for example, network routers configured within a premise (e.g., home or business), another UE 101a-101n or vehicle 103a-103n or a communicable traffic system (e.g., traffic lights, traffic cameras, traffic signals, digital signage). In one embodiment, the routing platform 105 aggregates probe data gathered and/or generated by the UEs 101a-101n and/or the vehicle 103a-103n resulting from the driving of multiple different vehicles over a road/travel network. The probe data may be aggregated by the routing platform 105 to providing an isoline map of a time to park at a destination.

By way of example, the routing platform 105 may be implemented as a cloud based service, hosted solution or the like for performing the above described functions. Alternatively, the routing platform 105 may be directly integrated for processing data generated and/or provided by service platform 109, content providers 115a-115k, and/or applications 111a-111n. Per this integration, the routing platform 105 may perform candidate routes calculation based on user/vehicle trajectory information and/or public transport information.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101a-101n, the vehicles 103a-103n, the routing platform 105, the service platform 109, and the content providers 115a-115k communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
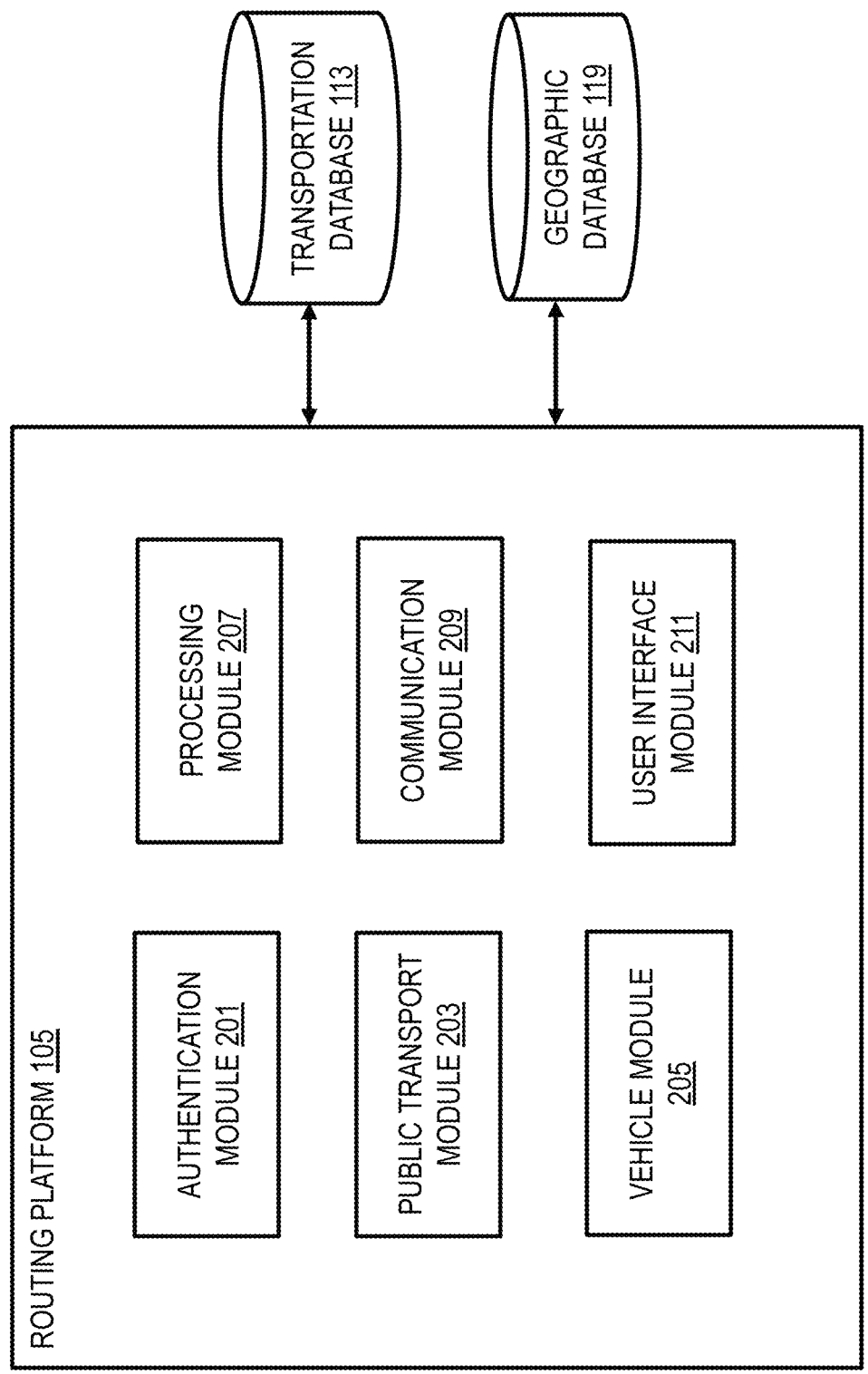
FIG. 2 is a diagram of the components of a routing platform, according to one embodiment.

FIG. 2 is a diagram of the components of a routing platform, according to one embodiment. By way of example, the routing platform 105 includes one or more components for providing an isoline map of a time to park at a destination. It is contemplated that the functions of these components may be combined or performed by other components of equivalent functionality. In this embodiment, the routing platform 105 includes an authentication module 201, a public transport module 203, a vehicle module 205, a processing module 207, a communication module 209, and a user interface module 211.

In one embodiment, the authentication module 201 authenticates UEs 101a-101n and/or associated vehicles 103a-103n for interaction with the routing platform 105. By way of example, the authentication module 201 receives a request to access the routing platform 105 via an application 111a-111n. The request may be submitted to the authentication module 201 via the communication module 209, which enables an interface between the navigation application 111a-111n and the platform 105. In addition, the authentication module 201 may provide and/or validate access by the UE 101a-101n to upload trajectory data, and/or other location-based information to the platform 105. In one embodiment, the authentication module 201 may further be configured to support and/or validate the formation of profile by a provider of a service 109 or content provider(s) 115a-115k, e.g., for supporting integration of the capabilities for providing an isoline map of a time to park at a destination with said providers 115a-115k or services 109.

The public transport module 203 retrieves the public transport data 123 (including fixed-route and/or on-demand public transports and associated schedules and timestamps) from various sources such as the transportation database 113, transit agencies, public transportation operators, etc. In one embodiment, the public transport module 203 aggregates schedules of various public transport that are operated on fixed schedules. In another embodiment, the public transport module 203 analyzes trajectory data (including associated timestamps) uploaded by one or more authenticated public transport passenger UE 101a-101n and/or various public transport to determine the status of the transports that operate on demand and/or the respective probability that the transports arrive at or nearby a parking space. In one embodiment, the public transport module 203 may receive other related data along with the trajectory data or segment lists such as acceleration, road curvature, vehicle tilt, driving mode, brake pressure, etc. It then stores the received data to database 113 optionally in association with a unique identifier of the various public transport that transmitted the trajectory data.

The vehicle module 205 collects and/or analyzes trajectory data (including associated timestamps) as generated by one or more authenticated UE 101a-101n and one or more vehicles 103a-103n. For example, the vehicle module 205 aggregates the trajectory data of travel segments generated by the UE 101a-101n and the one or more vehicles 103a-103n. In one embodiment, the vehicle module 205 may receive other related data along with the trajectory data or segment lists such as acceleration, road curvature, vehicle tilt, driving mode, brake pressure, etc. It then stores the received data to database 113 optionally in association with a unique identifier of the vehicle, driver of UE 101a-101n that transmitted the trajectory data or lists.

In one embodiment, the processing module 207 computes a time-based isoline with respect to a destination of the user. In one embodiment, the processing module 207 uses the time to park isoline routing algorithm to request a polyline that delineates a boundary of a geographic area surrounding the destination, wherein the isoline indicates an extent of the geographic area in which a time to park applies, and the time to park represents an estimated time that is needed for a vehicle to park within the geographic area.

In one embodiment, the processing module 207 provides an isoline map of a travel time on a route leg of an intermodal route to a destination. The processing module 207 computes the travel time on the route leg of the intermodal route. The route leg is among a plurality route legs of the intermodal route computed to reach the destination. The processing module 207 determines an isoline that delineates a boundary of a geographic area surrounding the destination that is reachable within the travel time on the route leg. The processing module 207 provides data to generate a user interface depicting a representation of the isoline with respect to the destination in the isoline map.

The processing module 207 further determines at least one alternate mode of transport that is located beyond the boundary of the geographic area and that has an estimated travel time less than the travel time on the route leg. The processing module 207 provides data to present another representation of the at least one alternate mode of transport in the user interface.

The processing module 207 further determines that the travel time on the route leg is increasing or decreasing over a monitored time period. The processing module 207 updates the representation of the isoline in the isoline map to indicate the increasing or the decreasing of the time to park.

The processing module 207 initiates a computation or a presentation of an alternate mode of transport, an alternate route, or a combination thereof based on determining that the travel time on the route leg has increased to or beyond a threshold value. The route leg is a last route leg of the intermodal route.

The processing module 207 deploys various mechanisms to estimate how long it will take a user to park within a geographic area surrounding the destination, such as real-time parking information (park in/out event) and related metrics like a churn rate per street, historical data, e.g. how long does it generally take a user at this time at this location to find a parking space, computing the number of cars looking for a parking space in this area (user in "parking search route" mode), traffic information, etc. A churn rate may be the parking turnover rate on each street, e.g., how many people park and leave, and then someone else comes in to park.

Figure 3A:
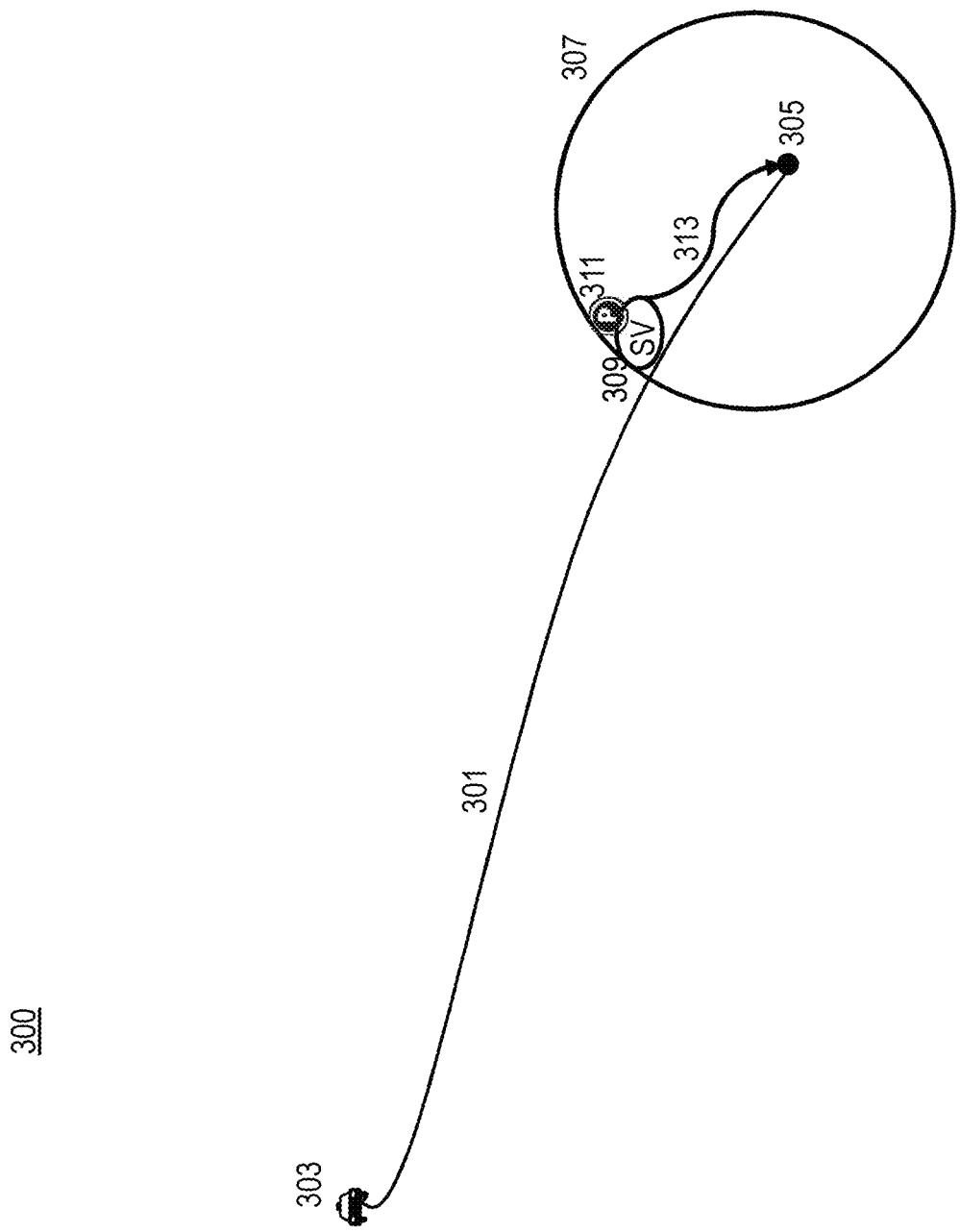
FIGS. 3A-3C are a diagrams user interfaces used in the processes for isoline routing a user, according to one embodiment.

FIG. 3 is a diagram of a user interface used in the processes for isoline routing a user, according to one embodiment. For example, the processing module 207 computes the time to park in a statistical way, including historical data of how long people needed to park in this geographic area. The time to park can be specified using any time unit including but not limited to seconds, minutes, hours, etc. The user interface 300 shown in FIG. 3A depicts a navigation route 301 from a starting location 303 to a destination 305, and a time to park isoline 301 around the destination 305 where a parking space can usually or averagely be found in, e.g., 15 minutes. This "time to park" often adds a non-neglectable time to the originally planned ETA. By way of example, at the starting time t0 of the navigation route, the user is estimated to drive 50 minutes to reach an isoline 307 delineating a geographic area surrounding the destination 305 in which it will take an average of 15 minutes to find a parking spot near the destination 303. In this case, the originally planned ETA is 65 minutes at time t0. To simplify FIG. 3, the isoline 307 is shown as a circle, but can be any other shape or boundary (e.g., bounded by road segments with on-street parking) of the geographic area in which it will take 15 mins (or the calculated TtP) to find parking near the destination 305.

Figure 3B:
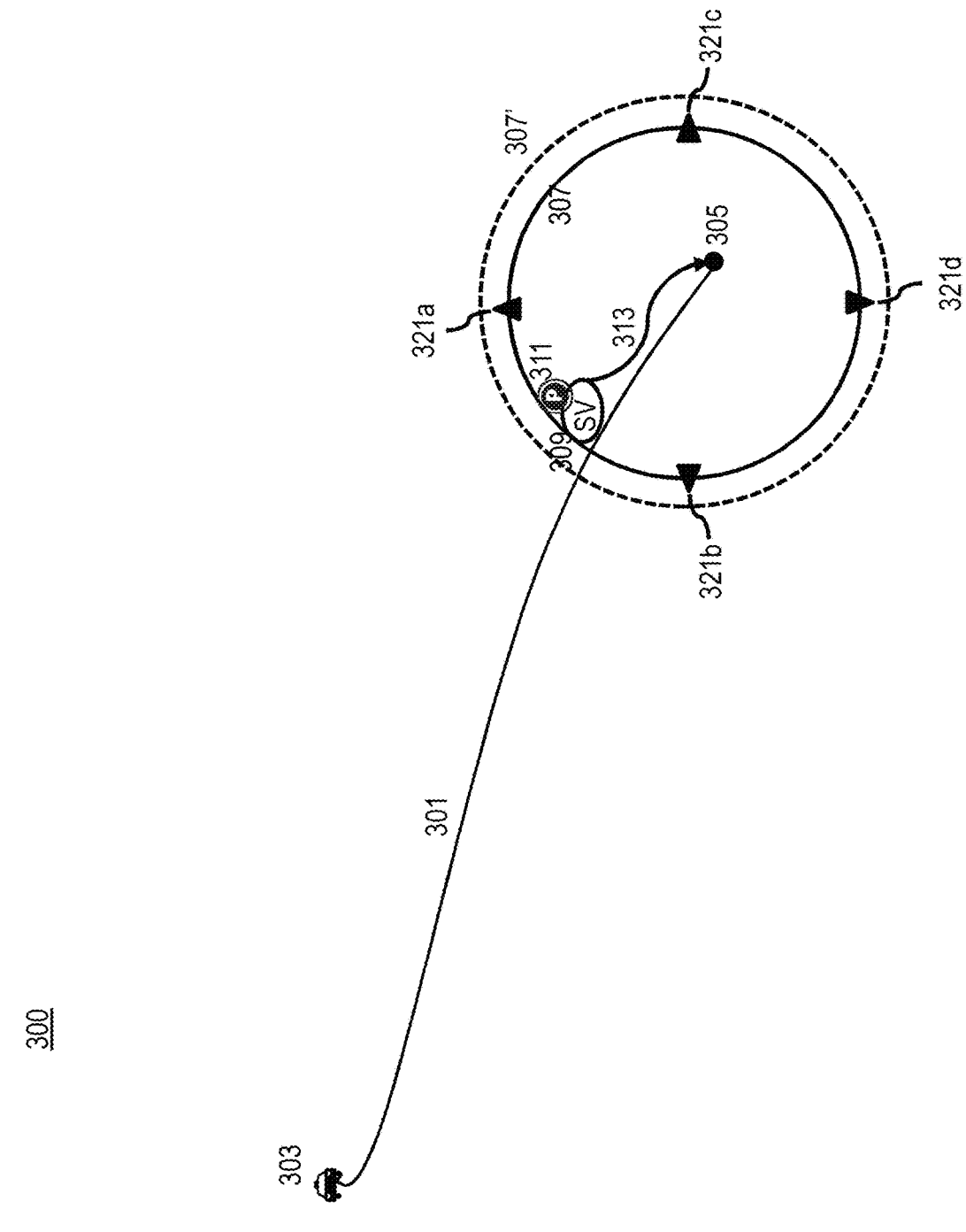

However, as the user drives the initial mode of transport (e.g., a car) an approaching the destination 305, real-time dynamic factors affecting parking availability may change and result in a different time to park than was initially calculated. Thus, in one embodiment, the routing platform 105 can monitor real-time information near the destination 305 to provide updates (e.g., real-time updates) to the corresponding time to park. Based on this monitoring, the isoline 307 may evolve to encompass a bigger or smaller area depending, for instance, on whether the time to park increasing or decreasing near the destination. In the example of FIG. 3B (which continues the example of FIG. 3A), the monitoring indicates that the time to park near the destination 305 is increasing (e.g., indicating that it is becoming more difficult to find parking). As the probability of parking goes down in the area A1 defined by a 15-min isoline 307 at t0, it takes longer time (e.g., 20 minutes) to find a parking spot in the area A1 defined by 20-min isoline at t1, while it takes 15 minutes to find a parking space in a larger area A2 defined by a new 15-min isoline 307' at t1. The 15-min isoline grows outwards from t0 to t1 because it takes longer time to find a parking space in the area A1 defined by the older 15-min isoline 307 as well as because the old 15-min search area A1 at t0 becomes the larger area A2 at t1. The user interface 300 of FIG. 3B can then be updated to present representations of this increasing trend (e.g., outward pointing arrows 321a-321d) overlaid on the isoline 307 so that a user can quickly ascertain the time to park is increasing.

Figure 3C:
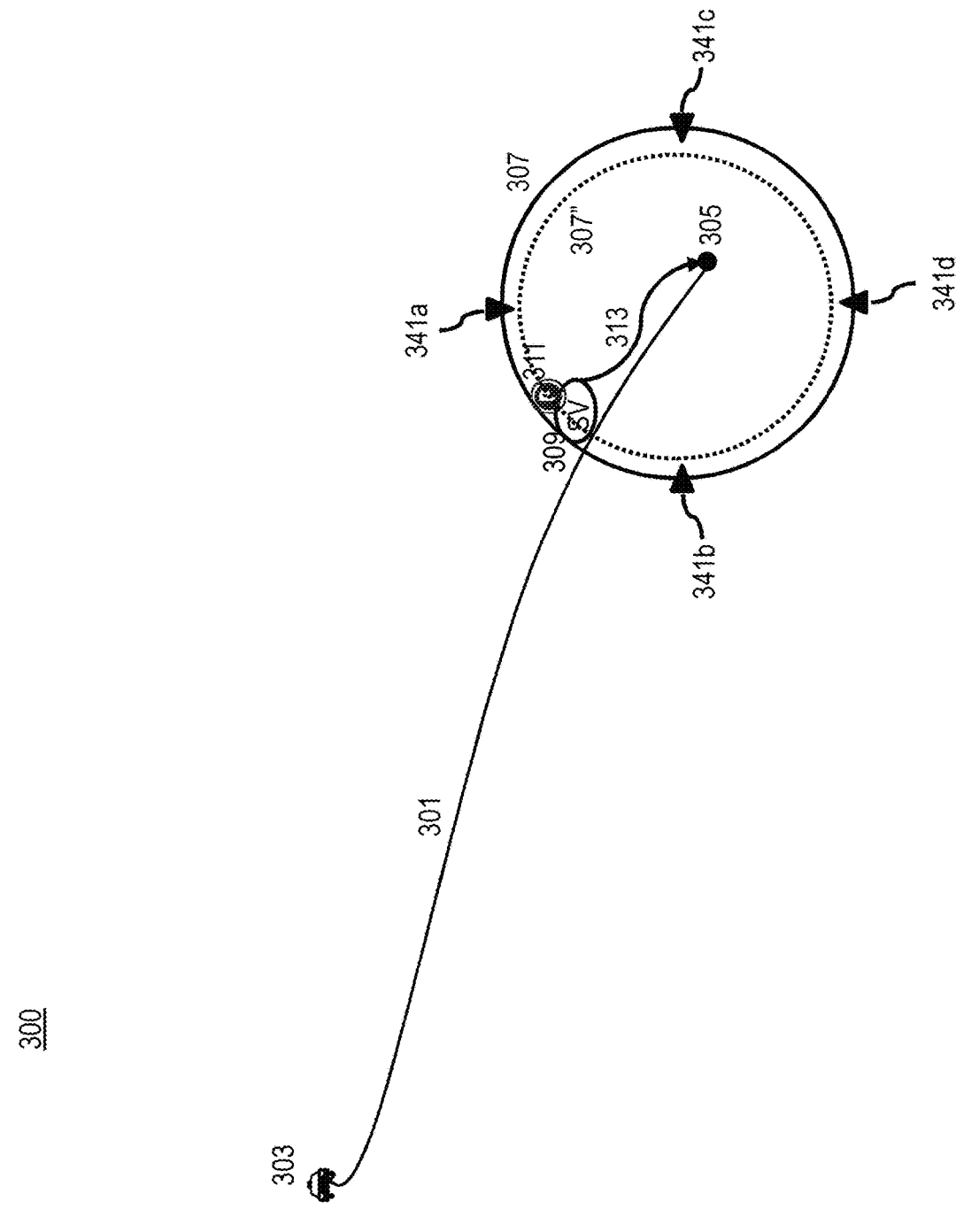

The example of FIG. 3C illustrates the opposite situation where the monitoring indicates that time to park is decreasing near the destination 305 (e.g., indicating that it is becoming easier to find parking). As the probability of parking goes up in the area A1 defined by a 15-min isoline 307 at t0, it takes shorter time (e.g., 10 minutes) to find a parking spot in the area A1 defined by a 10-min isoline 307' at t2, while it takes 15 minutes to find a parking space in a smaller area A3 defined by a new 15-min isoline 307" at t2. The 15-min isoline grows inwards from t0 to t2 because it becomes faster to find a parking space in the area A1 defined by the older 15-min isoline 307 as well as because the 15-min search area A1 at t0 becomes the smaller area A3 at t2. The user interface 300 of FIG. 3C can then be updated to present representations of this decreasing trend (e.g., inward pointing arrows 341a-341d) overlaid on the isoline 307 so that a user can quickly ascertain the time to parking is decreasing. It is noted that the arrows 321a-321d and 341a-341d are provided by way of illustration and not as limitations. It is contemplated that any type of representation (e.g., visual, audio, haptic, etc.) can be used to indicate or represent increasing or decreasing trends in the time to park at the destination 305.

In one embodiment, the processing module 207 computes a time to destination by adding together the initial mode of transport traveling time, the time to park, and at least one alternate mode of transport traveling time from a parking space to the destination from that parked position. By way of example, the user takes public transport or a shared vehicle near the parking space, and then walks 50 meters to the destination.

In one embodiment, the processing module 207 calculates the isolines, the time to park isoline map, and intermodal routes, based on the parking availability data and the modes of transport availability data as discussed.

In one embodiment, the processing module 207 calculates the isolines, the time to park isoline map, and intermodal routes, further based on one or more parking and/or traffic exclusion zones, scheduling information for the user, user preferences, etc. For example, the candidate intermodal routes and the isolines are calculated to avoid parking and/or traffic exclusion zones, such as parade routes, weekend pedestrian sidewalks, road work zones, etc. As another example, the processing module 207 factors in user' schedule including reaching the destination by certain time, when calculating the candidate intermodal routes and the respective isolines.

In another embodiment, the processing module 207 determines one or more updated destinations of the user. For example, the user just receives a call from a friend requesting a pick up at an updated destination. The processing module 207 re-computes updated the isolines, the time to park isoline map, and intermodal routes for the user using time to park isoline routing based on the one or more updated destinations, and provides data for indicating updated isolines and intermodal route isoline map to the user.

In one embodiment, once the isolines, the time to park isoline map, and intermodal routes are determined for all available transport modes, the processing module 207 can interact with the communication module 209 and/or the user interface module 211 to selectively present to the user the isolines, the time to park isoline map, and intermodal routes based on user interactions. By way of example, after the user selects a vehicle of an alternate mode of transport in the isoline map, the processing module 207 can interact with the communication module 209 and/or the user interface module 211 to present to the user either the selected vehicle or isolines of all available vehicles of the alternate mode of transport in an updated isoline map.

In one embodiment, the processing module 207 provides to the selected vehicle related navigation instructions, and/or other information determined for the selected vehicle to the destination. In another embodiment, the selected vehicle uses its own on board system to generate navigation instructions and/or other information for the vehicle, based on the candidate intermodal route, a respective riding location, and the destination.

Since there can be delays caused by traffic, weather, etc. for the user and/or the selected vehicle, the processing module 207 updates the user location, the selected vehicle location, or a combination thereof based on data from the transportation database 113 that is obtained via real-time monitoring by the system 100. In one embodiment, the processing module 207 updates the isolines based on the updated user location and vehicle locations, and updates the parking location and the time to park isoline map using the updated isolines.

It is further noted that the user interface module 211 may operate in connection with the communication module 209 to facilitate the exchange of real-time location information and/or transport mode information via the communication network 107 with respect to the services 109, content providers 115a-115k and applications 111a. Alternatively, the communication module 209 may facilitate transmission of the real-time location information and/or the transport mode information directly to the services 109 or content providers 115a-115k.

Figure 5A:
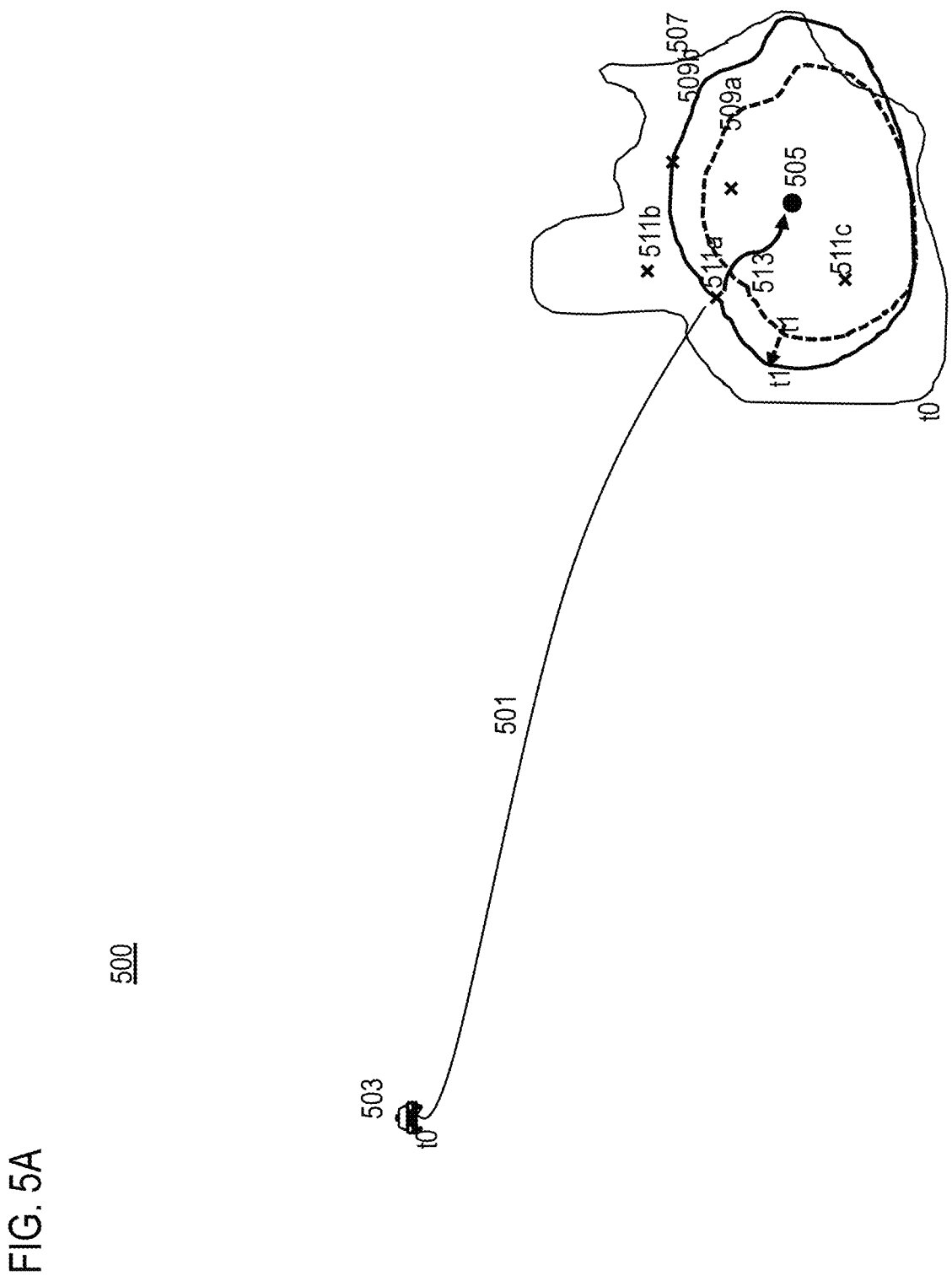
FIGS. 5A-5B are diagrams of user interfaces used in the processes for providing an isoline map of a time to park at a destination, according to various embodiments.

In other embodiments, the processing module 207 determines and presents isolines and intermodal routes in a the time to park isoline map as described later in conjunction with FIGS. 5A-5B.

The data for different modules of the routing platform 105 may be collected using a plurality of technologies including but not limited to drones, sensors, connected cars, cameras, probes, chipsets, or the like. The collected data may be processed by the processor to generate time to park isolines and the relevant recommendations according to the embodiments disclosed herein.

The above presented modules and components of the routing platform 105 can be implemented in hardware, firmware, software, or a combination thereof. Though depicted as a separate entity in FIG. 1, it is contemplated that the platform 105 may be implemented for direct operation by respective UEs 101a-101n and/or vehicles 103a-103n. As such, the routing platform 105 may generate direct signal inputs by way of the operating system of the UE 101a-101n and/or vehicles 103a-103n for interacting with the application 111a. In another embodiment, one or more of the modules 201-211 may be implemented for operation by respective UEs 101a-101n and/or vehicles 103a-103n as a platform 105, cloud based service, or combination thereof.

It is noted that although the various embodiments described herein are discussed with respect to presenting an isoline based on a TtP at a destination, it is contemplated that the isoline represent other routing parameters near the destination, such as a time to complete a multimodal route to the destination. For example, the portion of the route involving a parking search that corresponds to the TtP can be considered a discrete leg of the overall intermodal route. Accordingly, in one embodiment, the isoline can also be applicable for conveying or delineating a time to complete a route leg of an overall route (e.g., an intermodal route comprising multiple legs of different transport modes). This route leg can be a last leg to the destination or some other intermediate leg. In one use case, the last leg may be an intermodal leg where the user transitions from a vehicle to an electric scooter. The routing platform 105 can monitor a time to find/reserve the scooter or time for using scooter to reach the destination or a next leg. The isoline around the destination can then be based on the time to complete the route leg or to find/access the transport mode for the route leg.

Figure 4:
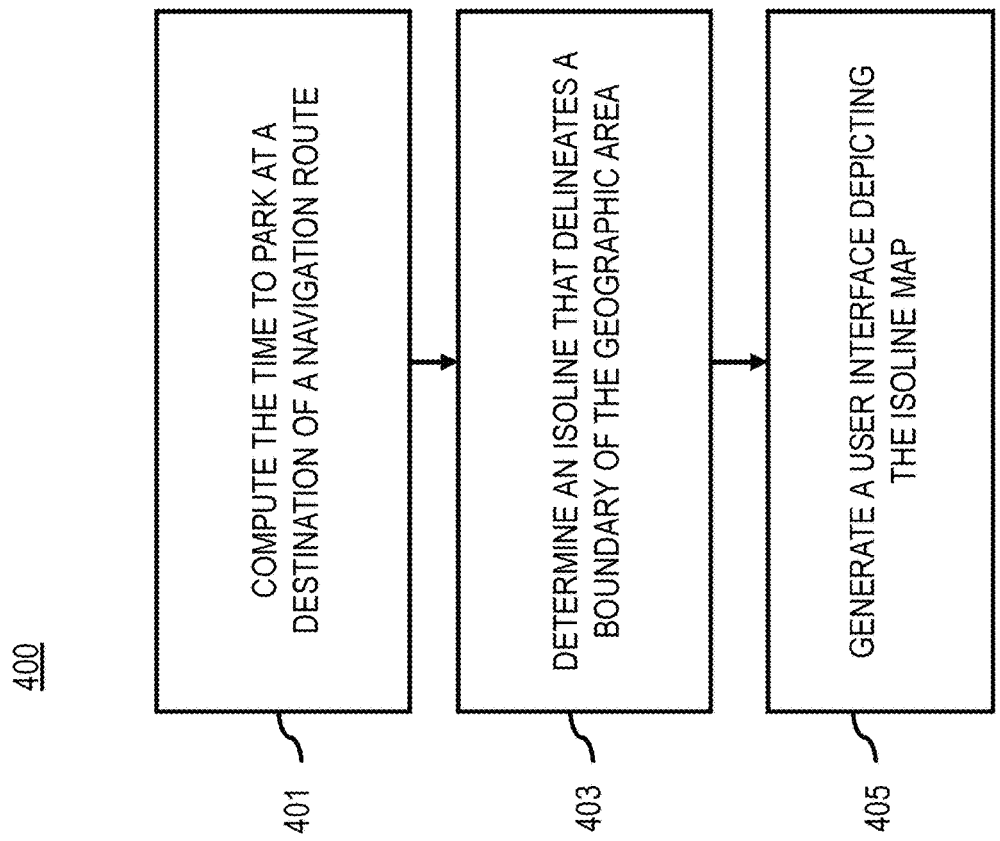
FIG. 4 is a flowchart of a process for providing an isoline map of a time to park at a destination, according to one embodiment.
Figure 9:
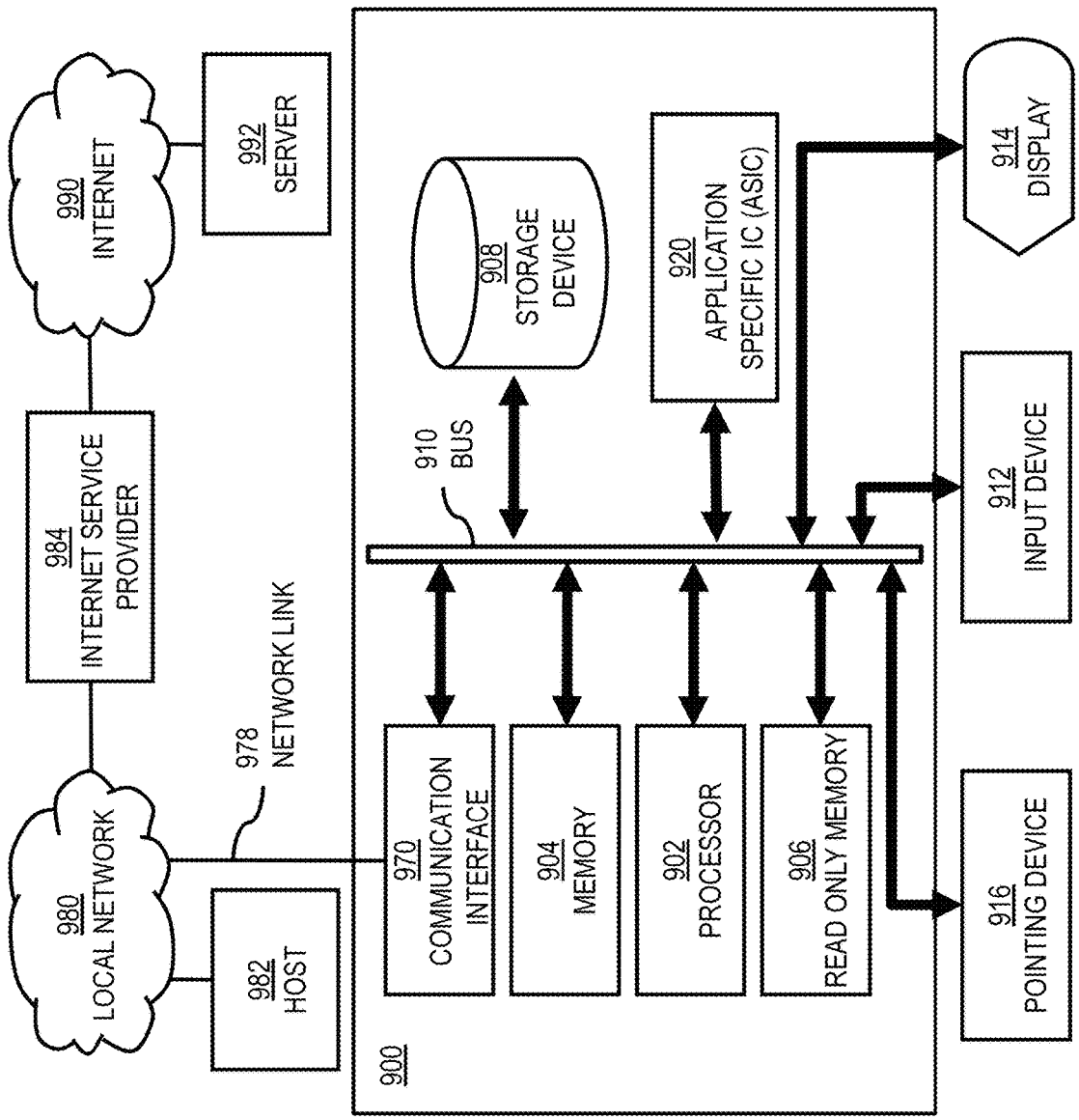
FIG. 9 is a diagram of hardware that can be used to implement an embodiment.

FIG. 4 is a flowchart of a process for providing an isoline map of a time to park at a destination, according to one embodiment. In one embodiment, the routing platform 105 performs the process 400 and is implemented in, for instance, a chip set including a processor and a memory as shown in FIG. 9. In addition or alternatively, all or a portion of the process 400 may be performed locally at the UE 101a-101n and/or vehicle 103a-103n (e.g., via the application 111a or another equivalent hardware and/or software component). The time to park isoline map may be a schematic or real size map.

In step 401, the routing platform 105 computes the time to park at a destination of a navigation route, and the time to park represents an estimated time that is needed for a vehicle to park within a geographic area surrounding the destination. For example, the routing platform 105 computes the time to park in a statistical way, including historical data of how long people needed to park in this geographic area. FIGS. 5A-5B are diagrams of user interfaces used in the processes for providing an isoline map of a time to park at a destination, according to various embodiments.

The destination of a user may be a location with a corresponding address, a point of interest, such as, school, mall, etc., an area in a geographical region, a restricted transit area or zone, such as, a no parking zone, only electric vehicle zone, no diesel zone, a destination within the restricted transit area, or the like.

In one embodiment, the routing platform 105 determines the destination based on a user input (e.g., text, audio, video, etc.). In another embodiment, the routing platform 105 determines the destination based on a mobility graph (e.g., learning user behaviors, the user's familiarity index with the area, etc.) associated with a user, and computes the intermodal route with respect to the at least one destination.

In step 403, the routing platform 105 determines an isoline that delineates a boundary of the geographic area, and the isoline indicates an extent of the geographic area in which the time to park applies. In one embodiment, the routing platform 105 uses the time to park isoline to look for alternative routes for users through shared vehicles cluster (such as mobility hubs).

The time to park can be specified in seconds, minutes, hours, or other time segments. As mentioned, the time to park isoline may changes as a function of time, depending on the time of a day, which day of the week, etc. The user interface 500 shown in FIG. 5A depicts a navigation route 501 from a starting location 503 to a destination 505, a time to park isoline 507 at time t0, a time to park isoline 509 at time t1 around the destination 505 where a parking space can usually or averagely be found in, e.g., 15 minutes. This "time to park" often adds a non-neglectable time to the originally planned ETA. By way of example, at the starting time t0 of the navigation route, the user is estimated to drive 45 minutes to reach a geographic area 507 surrounding the destination, and then to spend 15 minutes to find a parking spot adjacent to the destination 503. At the starting time t1 of the navigation route, the user is estimated to drive 50 minutes to reach a geographic area 509a surrounding the destination, and then to spend 15 minutes to find a parking spot adjacent to the destination 503.

In step 405, the routing platform 105 provides data to generate a user interface depicting a representation of the isoline with respect to the destination in the isoline map. Once a TtP threshold (e.g., 15 minutes) is reached (set by the system 100 or triggered by the user on demand), the routing platform 105 starts looking for route alternatives (e.g. intermodal routes) to leverage the mobility hubs.

By way of example, the originally planned ETA is 60 minutes at time t0 and 65 minutes at time t1. However, as the user drives the initial mode of transport (e.g., a car) approaching the geographic area 509b at time t1, the geographic area 509a (drawn in s dotted line) evolves into a bigger area 509b (drawn in a solid line). As the time to park keeps increasing while the user gets closer to the destination 505, i.e., the parking situation is getting worse, and the routing platform 105 indicates the increasing time via the growing isoline 509 on the map. This can also be a signal that an alternate mode of transport (e.g., intermodal routes by parking earlier and riding a bike/scooter) could be a time-saving solution.

In one embodiment, the routing platform 105 determines real-time availability data of a plurality of parking spaces and modes of transport within a geographic area. By way of example, the real-time availability data includes at least one of: an availability of a shared vehicle (e.g., a car, motorcycles, electric bike, electric scooter, bicycle, boat, airplane, etc.), an operating area of a shared vehicle, public transport information, a mobility history of a user (e.g., user trajectory data), user preference information (e.g., extracted from the user profile data 129), user registration information with a mobility service (e.g., extracted from the user profile data 129), contextual information (e.g., extracted from the user context data 131), a user destination (e.g., based on an user input, extracted from the user context data 131, etc.), or a combination thereof.

The routing platform 105 computes the probability of alternate modes of transport to be available at or near some parking locations 511a-511c, some of which may be transport hubs/stations, uses the data for the intermodal computation, and recommends transferring to a bike/scooter at the parking location 511a to reach the destination 505 via route 513.

In one embodiment, the routing platform 105 renders one or more vehicle representations of one or more shared vehicles (e.g., a car, motorcycle, electric bike, electric scooter, bicycle, etc.) associated with the plurality of combinations in the user interface 500 before, concurrently, or after rendering the isolines 507, 509a, 509b, and receives an interaction for selecting at least one of the one or more vehicles (e.g., e-scooter) via the user interface 500. The routing platform 105 proactively reserves the alternate mode of transport for the user at or near the parking location once the user or users accept the recommendation.

In one embodiment, the routing platform 105 automatically decides the intermodal route for the user based on a cost function including routing cost function parameters such as distance, fuel efficiency, etc. customized for the user. In other embodiments, the routing platform 105 automatically decides the intermodal route based on the cost function, user preferences (e.g., comfort, vehicle models, vehicle seat numbers, cruise control, etc.), and/or user context, etc. For example, such optimum intermodal route may satisfy the requesting user's criteria (such as cost less than $15).

Figure 5B:
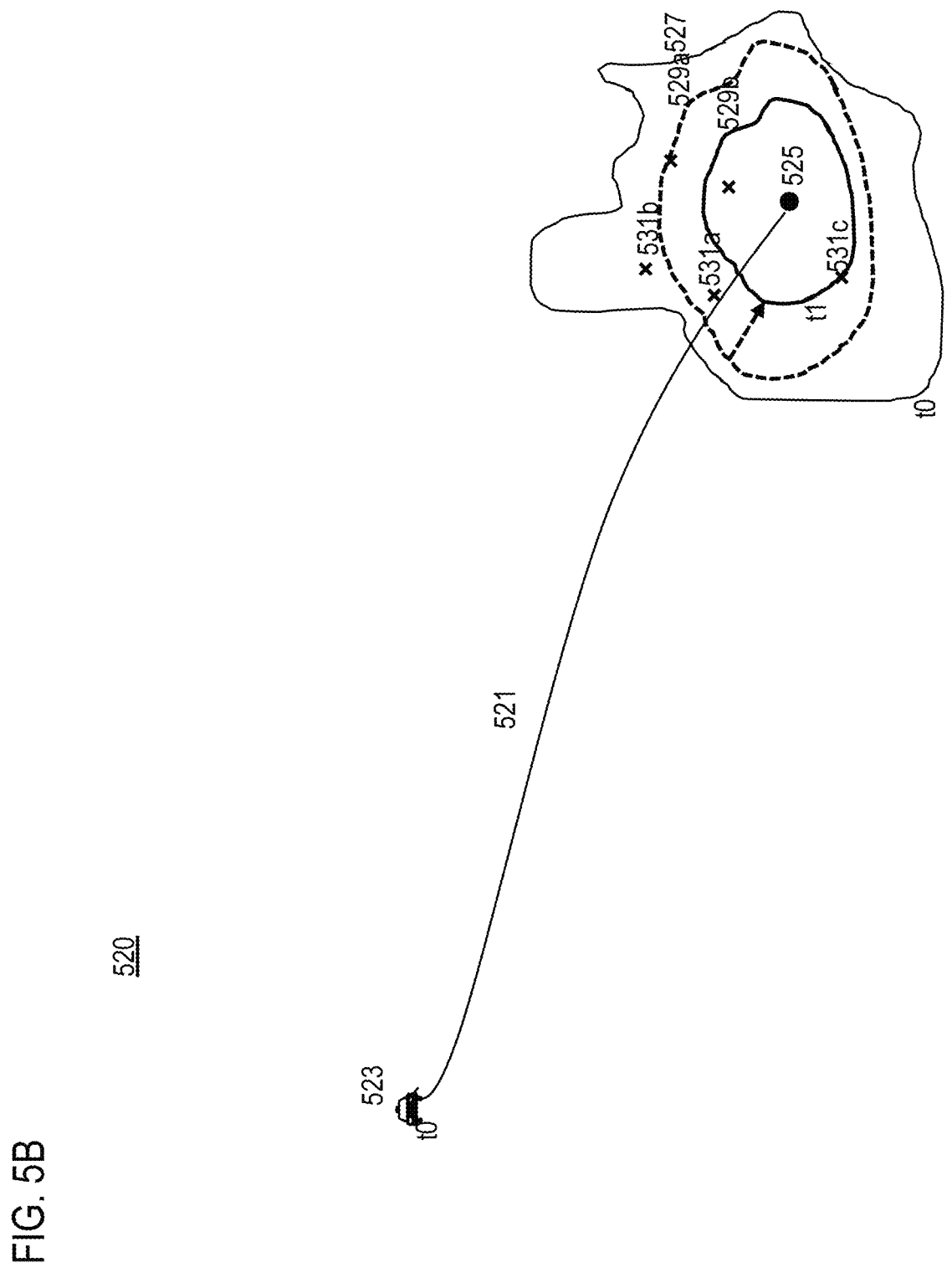

In another embodiment, the user interface 520 shown in FIG. 5B depicts a navigation route 521 from a starting location 523 to a destination 525, a time to park isoline 527 at time t0, a time to park isoline 529 at time t1 around the destination 525 where a parking space can usually or averagely be found in, e.g., 15 minutes. This "time to park" often adds a non-neglectable time to the originally planned ETA. By way of example, at the starting time t0 of the navigation route, the user is estimated to drive 55 minutes to reach a geographic area 527 surrounding the destination, and then to spend 10 minutes to find a parking spot adjacent to the destination 523. At the starting time t1 of the navigation route, the user is estimated to drive 50 minutes to reach a geographic area 529a surrounding the destination, and then to spend 15 minutes to find a parking spot adjacent to the destination 523.

By way of example, the originally planned ETA is 65 minutes at time t0 and 60 minutes at time t1. However, as the user drives the initial mode of transport (e.g., a car) approaching the geographic area 529b at time t1, the geographic area 529a (drawn in dotted line) evolves into a smaller area 529b (drawn in a solid line). As the time to park keeps decreasing while the user gets closer to the destination 525, i.e., the parking situation is getting better, and the routing platform 105 indicates the decreasing time via the shrinking isoline 529 on the map.

This can also be a signal that an alternate mode of transport (e.g., intermodal routes by parking earlier and riding a bike/scooter) are not necessary. The routing platform 105 recommends driving the initial mode of transport to reach the destination 525 via route 521. When the time to park decreases as the user approaches the destination, the routing platform 105 determines that the parking situation is getting better and that the user should try to look for a parking space next to the destination 525.

The routing platform 105 deploys a plurality of algorithms to implement the above-discussed embodiments. For example, the algorithms are related to geocoding, routing (multimodal, intermodal, and unimodal), machine learning in location based solutions, natural language processing algorithms, artificial intelligence algorithms, parking prediction algorithms, parking time prediction algorithms, and the like.

The routing platform 105 may deploy, for example, hierarchical clustering, k-means algorithm (centroid models), DBSCAN algorithm, density based OPTICS algorithm and graph-based models to predict the availability of parking spaces and/or modes of transport.

As mentioned previously, the high number of combinations between modes of transport makes it very expensive to compute all available combinations. One way to make this less computing expensive is compute the probability of vehicles to be available at some transport hubs/stations (or more generally locations, such as points of interest) and used the data for the intermodal isoline computation.

In one embodiment, the routing platform 105 computes a probability that at least one of the plurality of parking spaces and modes of transport will be available at a transport hub, such as the subway station 501, on the intermodal route based on the real-time availability data. In this example, the isoline is further based on the probability.

In one embodiment, the routing platform 105 calculates a probability that at least one of the plurality of parking spaces and modes of transport will be available at a transport hub based on machine learning, big data analysis, and factors such as the transport hub location, the modes of transport time table, the modes of transport trajectory data, etc. For example, the routing platform 105 calculates a probability D which a joint probability distribution or matrix for parameters X, Y, Z . . . that gives the probability that each of factors X, Y, Z . . . falls in any particular range or discrete set of values specified for that variable. For example, X is a vehicle's profile parameter (e.g., three of four times that the vehicle parks at the transport hub and one out of four times that the vehicle parks 0.5 mile from the transport hub), and Y is a is a transport timing parameter (e.g., on time vs. delay). To simplify the discussion, only X and Y are used to generate a joint probability distribution or matrix as in Table 1 as follows:

TABLE 1

|  | X = transport hub | X = 0.5 m away | P(Y) |
|---|---|---|---|
| Y = on time | (1)(¾) = ¾ | (1)(¼) = 0 | ¾ + 0 = ¾ |
| Y = delay | (0)(¾) = ¼ | (0)(¼) = 0 | ¼ + 0 = ¼ |
| P(X) | ¾ + ¼ = 1 | 0 + 0 = 0 |  |

By way of example, when the routing platform 105 determines the probability that the vehicle will reach the transport hub within 200 meters meets or exceeds a threshold value (e.g., 85%), the routing platform 105 presents the vehicle and the relevant intermodal mode to the user.

In another embodiment, the routing platform 105 continues monitoring the vehicle location as well as calculating the probability that the vehicle will reach the transport hub within a riding time frame of the relevant alternate mode of transport.

In another embodiment, the routing platform 105 computes a probability that at least one of the plurality of modes of transport will be available at a time when the at least one of the plurality of modes of transport is predicted to be used on the intermodal route based on the real-time availability data. In this example, the isoline is further based on the probability.

Figure 6A:
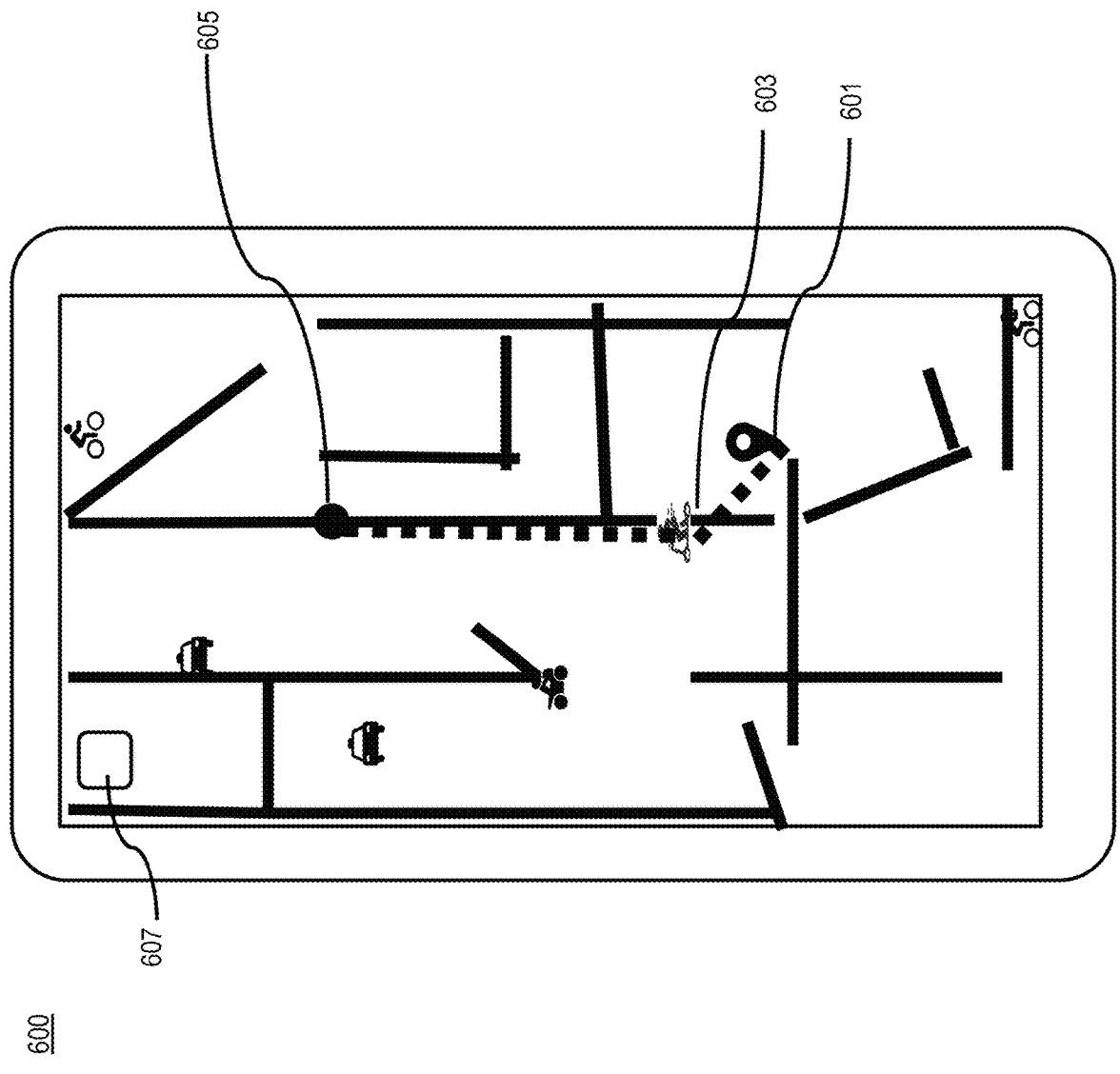
FIGS. 6A-6B are diagrams of user interfaces used in proactive booking of a shared vehicle to reach the destination, according to various embodiments.
Figure 6B:
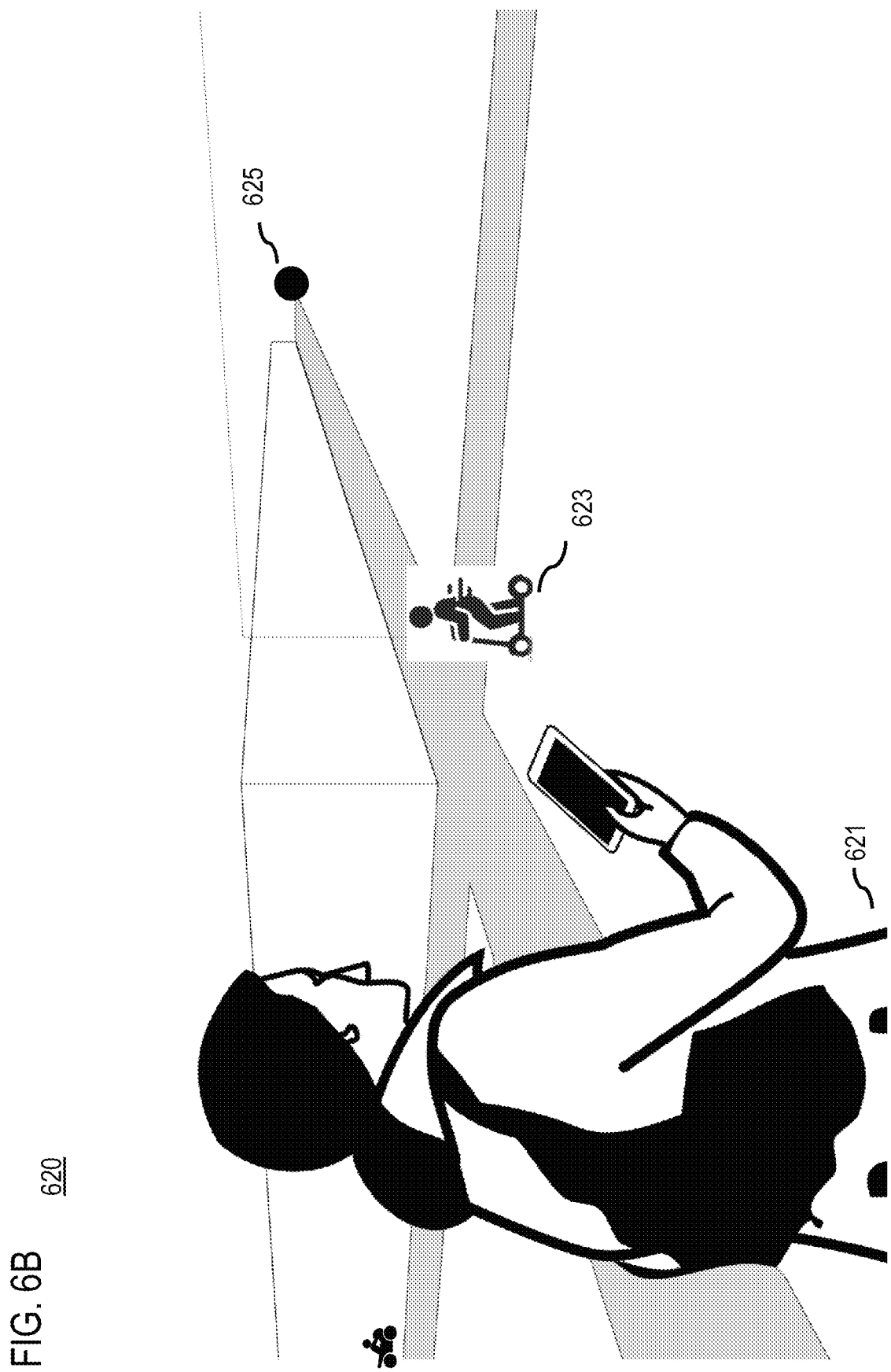

FIGS. 6A-6B are diagrams of user interfaces used in for proactive booking of a shared vehicle to reach the destination, according to various embodiments. More specifically, FIGS. 6A-6B illustrate user interfaces that can be used in real-time by UEs 101a-101n participating in a routing service provided by the system 100. In one embodiment, the routing platform 105 initiates a reservation of an alternate mode of transport for the user to reach the destination. In the user interface 600 of FIG. 6, the routing platform 105 guides the user to park at a parking space 601 to walk to a proactively reserved scooter 603 to ride to a destination 605. To simplify the discussion, FIG. 6 shows travel segments as straight lines instead of real-world road lines on a map.

When a presentation switch icon 607 is selected, the routing platform 105 switches the presentation among a two-dimensional user interface, a three-dimensional user interface, an augmented reality user interface, etc. FIG. 6B is a diagram of a user interface 620 used in the processes for guiding a passenger to a reserved shared vehicle, according to one embodiment. For example, upon the selection of the presentation switch icon 607 in FIG. 6, the presentation switches from the two-dimensional user interface 600 into a three-dimensional user interface 620 augmented with a human graphic FIG. 621, which can be a photo of the user, an avatar with the user's look, an avatar of other look, etc., that matches with the current location and orientation of the user in the physical world. The routing platform 105 continues guiding the user to walk to a proactively reserved scooter 623 to ride to a destination 625.

The computation of the different embodiments mentioned previously can be done partially or totally on servers/cloud, or at the edge of the network in order to balance the network load/cellular usage.

The above-discussed embodiments support determination of a time to park isoline map with respect to a destination, compute the most efficient and cost effective combination of different modes of transport (including public transport, shared vehicles, etc.) to reach the destination after parking, and recommend a parking space with an alternate mode of transport based on an opportunistic approach.

The above-discussed embodiments allow users to visualize the time to park isoline map thereby considering the most efficient and cost effective intermodal route to optimize travel cost/distance/time.

The above-discussed embodiments provide users more advanced and reliable information about the parking spaces and alternate modes of transport within a geographic area surrounding the destination be reached within a given amount of time, which were likely not known to the users by previously existing methods.

The above-discussed embodiments allow drivers to make wiser decisions by viewing the "time to park" using destination-centered isolines that reflect at a certain time a time required to find a parking space within a geographic area surrounding the destination, and leverage the most up-to-date information about available vehicles to offer the best intermodal combination.

The above-discussed embodiments real-time monitor the travel status of the user and the vehicle and adjust the intermodal route accordingly (e.g., in case of traffic delays).

The above-discussed embodiments combine different technologies (sensors, probability computation, multimodal routing, intermodal routing, mobility graph, isoline routing, geofencing, real-time modelling of vehicles' availability, machine learning, big data analysis, etc.) to provide parking spaces and alternate modes of transport recommendation via an isoline map of a time to park at a destination as necessary.

Figure 7:
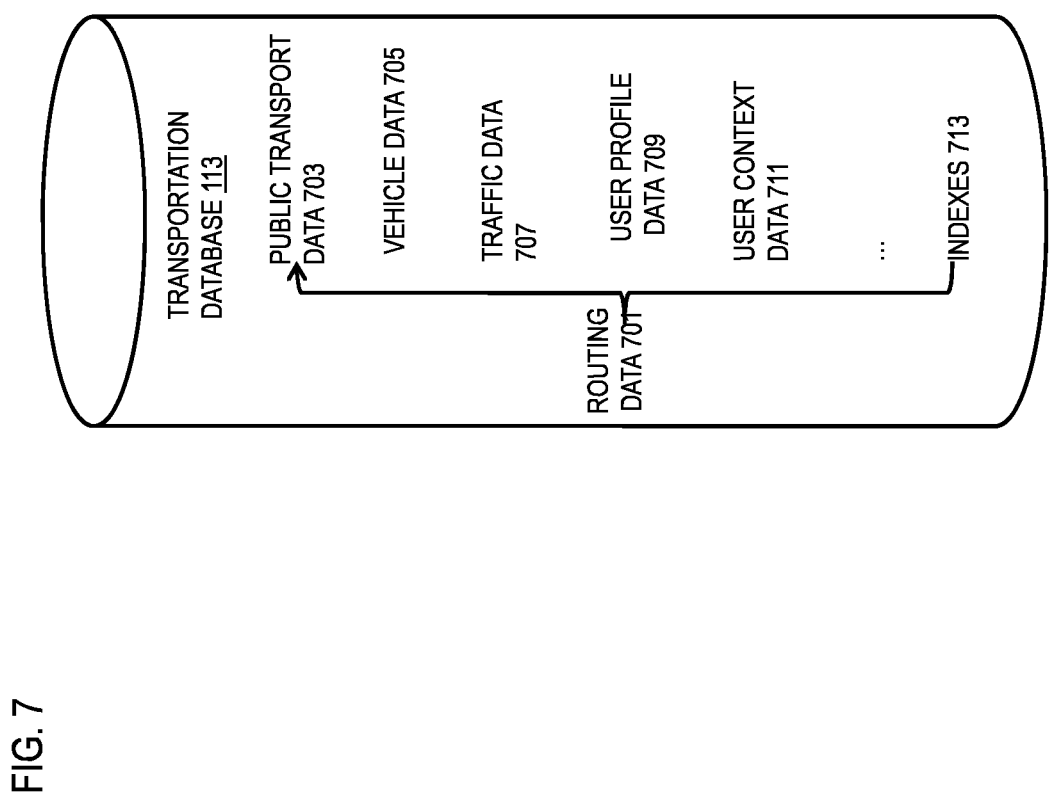
FIG. 7 is a diagram of a transportation database capable of storing data for providing an isoline map of a time to park at a destination, according to one embodiment.

FIG. 7 is a diagram of the transportation database 113, according to one embodiment. In one embodiment, vehicle information and/or any other information used or generated by the system 100 with respect to providing an isoline map of a time to park at a destination based on routing data 701 stored in the transportation database 113, and associated with and/or linked to the geographic database 119 or data thereof.

In one embodiment, the routing data 701 include public transport data 703, vehicle data 705, traffic data 707, user profile data 709, user context data 711, indexes 713, etc. In one embodiment, the public transport data 703 can include any public transport data item used by the routing platform 105 including, but not limited to public transport type data, public transport schedule data, e.g., according to the General Transit Feed Specification (GTFS), public transport route and stop data, real-time public transport trajectory data, e.g., according to the GTFS real-time extensions, etc. retrieved from transit agencies, public transportation operators, etc. In one embodiment, the public transport data can be used in junction with the user profile data 709 and the user context data 711 to support the determination and visualization of the time to park isoline map. In another embodiment, the traffic data 707 is further included to support the determination and visualization of the time to park isoline map. The public transport data format may be in General Transit Feed Specification (GTFS), REST/XML, or other industry standards for publishing transportation network and schedule data. In one embodiment, the public transport include on-demand services (e.g., taxis, shared vehicles, etc.) and fixed-route services such as city buses, trolleybuses, trams (or light rail) and passenger trains, rapid transit (metro/subway/underground, etc.), ferries, airlines, coaches, inter-city rail, etc.

In one embodiment, the vehicle data 705 can include any vehicle data item used by the routing platform 105 including, but not limited to vehicle type data, vehicle ownership data, vehicle route and stop data, real-time vehicle trajectory data, parking instance data, timestamp information for the parking instance data, etc. to support the determination and visualization of the time to park isoline map. In another embodiment, the traffic data 707 is further included to support the determination and visualization of the time to park isoline map.

In one embodiment, the traffic data 707 includes, but not limited to, travel speeds, congestions, detours, vehicle types and volumes, accidents, road conditions, road works, etc. on specific road segments.

In one embodiment, the user profile data 709 includes, but not limited to, the name, name, login named, screen named, nicknamed, handle names, home addresses, email addresses, government identification numbers, operator license/credential types (motorcycle, regular passenger vehicle, commercial vehicle, etc.), vehicle registration plate numbers, face, fingerprints, handwriting, credit card numbers, digital identities, date of birth, age, birthplace, genetic information (e.g., gender, race, etc.), telephone numbers, marriage status/records, criminal records, purchase records, financial data, activity records, employment records, insurance records, medical records, political and non-political affiliations, preferences (e.g., POIs), calendar data, driving history data, vehicle sharing data, subscription and additional privileges data associated with different mobility providers from the user, modes of transport preferences, etc. of the driver/requesting user. By way of example, the user may select regular bikes over e-bikes, scooters over rollers based on a travel distance, e.g., the user prefers a bicycle for a distance less than 2 kilometers (kms), and an e-bike for a distance of 2-4 km.

In one embodiment, the user context data 711 includes, but not limited to, a destination of the requesting user, a type of the destination of the user, a proximity of the user location to a riding point or the destination, availability of an alternate destination for the user, a number of passengers accompanying the user, weather data in the vicinity of the user, etc.

More, fewer or different data records can be provided in the transportation database 113. One or more portions, components, areas, layers, features, text, and/or symbols of the routing data records in the transportation database 113 can be stored in, linked to, and/or associated with one or more of the data records of the geographic database 119 (such as mapping and/or navigation data).

The transportation database 113 can be maintained by the content provider in association with the service platform 109 (e.g., a map developer). The map developer can collect driving/parking data and geographic data to generate and enhance the transportation database 113 and/or the geographic database 119. There can be different ways used by the map developer to collect data. These ways can include obtaining data from other sources, such as municipalities or respective transportation authorities.

The transportation database 113 can be stored in a format that facilitates updating, maintenance, and development of the relevant data. For example, the data in the transportation database 113 can be stored in an Oracle spatial format or other spatial format. The Oracle spatial format can be compiled into a delivery format, such as a geographic data files (GDF) format to be compiled or further compiled to form transportation database products or databases, which can be used in end user navigation devices or systems.

As mentioned above, the transportation database 113 and the geographic database 119 are separate databases, but in alternate embodiments, the transportation database 113 and the geographic database 119 are combined into one database that can be used in or with end user devices (e.g., UEs 101a-101n) to provide navigation-related functions and provide shared vehicle information. For example, the databases 113, 119 are assessible to the UE 101a-101n directly or via the routing platform 105. In another embodiments, the databases 113, 119 can be downloaded or stored on UE 101a-101n, such as in applications 111a-111n.

Figure 8:
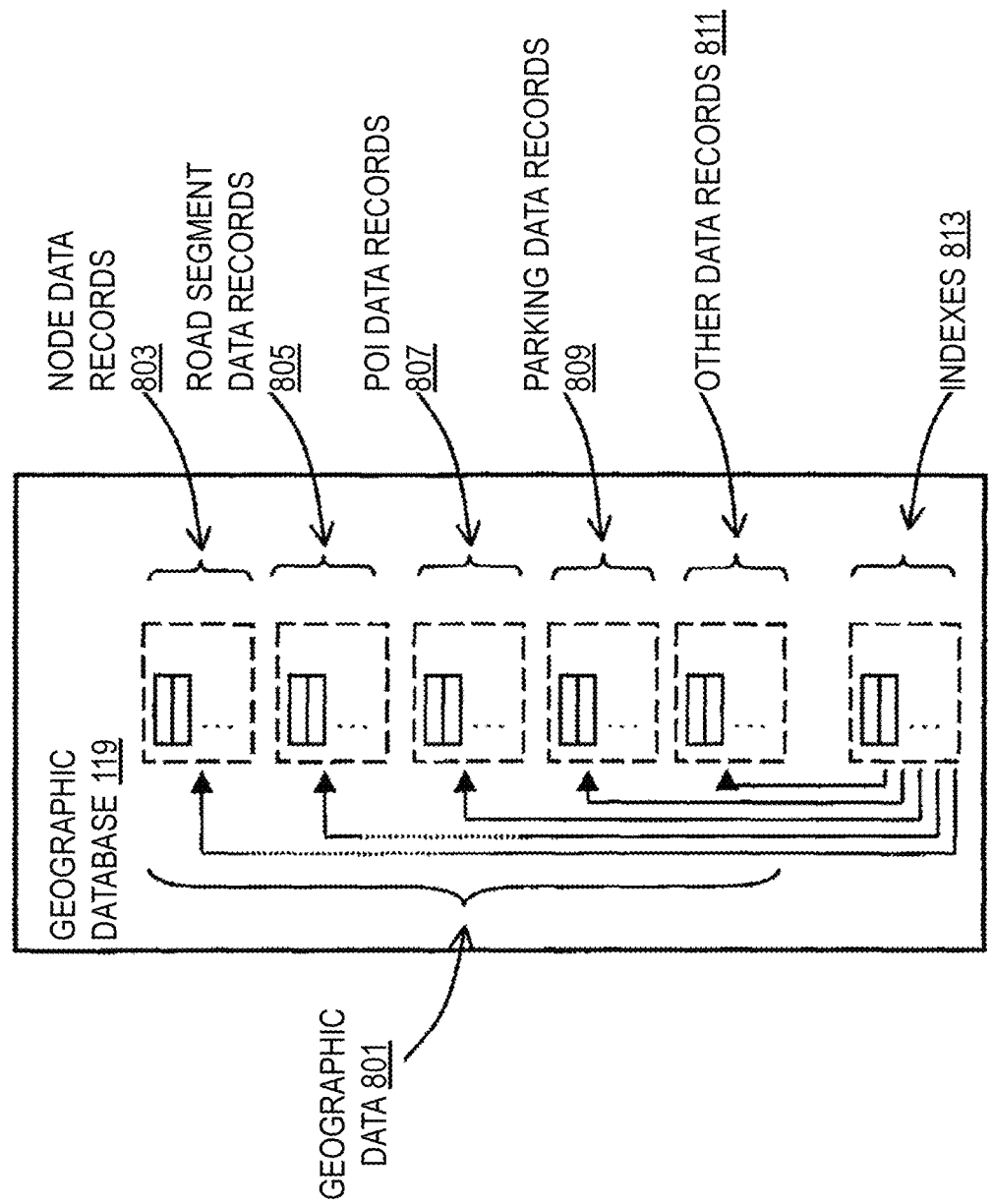
FIG. 8 is a diagram of a geographic database capable of storing map data for providing an isoline map of a time to park at a destination, according to one embodiment.

FIG. 8 is a diagram of a geographic database 119 capable of storing map data for providing an isoline map of a time to park at a destination, according to one embodiment. In one embodiment, the geographic database 119 includes geographic data 801 used for (or configured to be compiled to be used for) mapping and/or navigation-related services, such as for routing drones to create a 3D flightpath or route. In one embodiment, the 3D flightpath or route is executed by a drone for package delivery to a target delivery location (e.g., a balcony or other location in a target building). For example, the geographic database 801 stores model data (e.g., 3D object models of underground passageways and their entry/exit points) among other related data.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 119.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 119 follows certain conventions. For example, links do not cross themselves and do not cross each other except at a node. Also, there are no duplicated shape points, nodes, or links. Two links that connect each other have a common node. In the geographic database 119, overlapping geographic features are represented by overlapping polygons. When polygons overlap, the boundary of one polygon crosses the boundary of the other polygon. In the geographic database 119, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 801 of the geographic database 119 includes node data records 803, road segment or link data records 805, POI data records 807, parking data records 809, other data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 119. In one embodiment, the indexes 813 may be used to quickly locate data without having to search every row in the geographic database 119 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. In addition, the geographic database 119 can contain path segment and node data records or other data that represent 3D paths around 3D map features (e.g., terrain features, buildings, other structures, etc.) that occur above street level, such as when routing or representing flightpaths of aerial vehicles (e.g., drones), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 119 can include data about the POIs and their respective locations in the POI data records 807. The geographic database 119 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 119 can also include parking data records 809 for the digital map data representing mapped the network of mapped off-street and on-street parking spaces and/or facilities, physical characteristic data, usage rates, operating hours, and/or any other related data as described in the embodiments above. In one embodiment, the parking data records can include any data item used by the routing platform 105 including, but not limited to parking areas and/or spaces, travel segments within the parking areas and/or spaces to monitor, number of spaces, parking availability information, timestamp information for the parking availability information, fluctuation information about the parking availability information, trajectory data, timestamps associated with the trajectory data, etc.

In one embodiment, the parking data records includes 3D model data of the parking spaces and/or facilities that can be created from LiDAR, aerial/satellite-based 3D sensor data, and/or other 3D sensor data collected for a geographic area. For example, mobile mapping vehicles equipped with LiDAR and/or equivalent sensors can provide 3D model data. Parking map data can also be obtained with portable or smaller mapping devices/vehicles used to access the parking spaces and/or facilities for scanning or mapping. In one embodiment, the parking data records 809 can be associated with one or more of the node records 803, road segment records 805, and/or POI data records 807 so that the mapped parking spaces and/or facilities can inherit characteristics, properties, metadata, etc. of the associated records (e.g., location, address, POI type, etc.). In one embodiment, the system 100 (e.g., via the routing platform 105 can use the additional characteristics, properties, metadata, etc. to generate an isoline map of a time to park at a destination. In one embodiment, the parking data records 809 can include a data layer for storing real-time data on the availability of the parking spaces and/or facilities to support intermodal routing according to the embodiments described herein.

In one embodiment, the geographic database 119 can be maintained by the services platform 109 and/or any of the services of the services platform 109 (e.g., a map developer). The map developer can collect geographic data to generate and enhance the geographic database 119. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 119 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the drone, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing an isoline map of a time to park at a destination may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 9 illustrates a computer system 900 upon which an embodiment of the invention may be implemented. Computer system 900 is programmed (e.g., via computer program code or instructions) to provide an isoline map of a time to park at a destination as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing an isoline map of a time to park at a destination. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RANI) or other dynamic storage device, stores information including processor instructions for providing an isoline map of a time to park at a destination. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing an isoline map of a time to park at a destination, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 119 for providing an isoline map of a time to park at a destination.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 10:
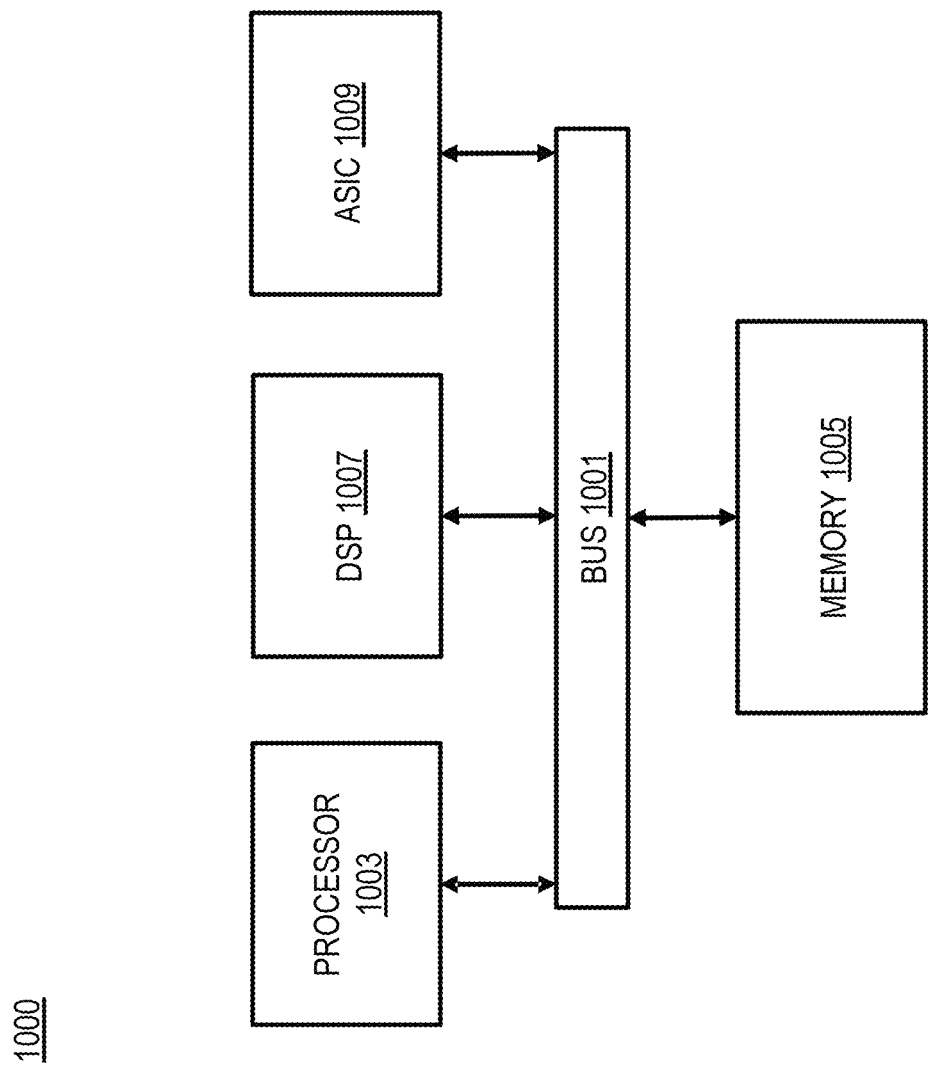
FIG. 10 is a diagram of a chip set that can be used to implement an embodiment.

FIG. 10 illustrates a chip set 1000 upon which an embodiment of the invention may be implemented. Chip set 1000 is programmed to provide an isoline map of a time to park at a destination as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide an isoline map of a time to park at a destination. The memory 1005 also stores the data associated with or generated by the execution of the inventive steps.

FIG. 11 is a diagram of exemplary components of a mobile terminal 1101 (e.g., client device such as the UE 101a-101n or drone or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide an isoline map of a time to park at a destination. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing an isoline map of a time to park at a destination, comprising:
computing, by a processor, the time to park at a destination of a navigation route, wherein the time to park represents an estimated time that is needed for a vehicle to park within a geographic area surrounding the destination, wherein the time to park is computed based on at least real-time parking information; and wherein the time to park is a difference in time between the time of reaching the geographic area surrounding the destination and the time of reaching a parking space within the geographic area surrounding the destination;
determining an isoline that delineates a boundary of the geographic area, wherein the isoline indicates an extent of the geographic area in which the time to park applies;
providing data to generate a user interface depicting a representation of the isoline with respect to the destination in the isoline map;
determining at least one alternate mode of transport that is located beyond the boundary of the geographic area delineated by the isoline and that has an estimated time of arrival less than the time to park, wherein the vehicle position is obtained from one or more location sensors;
determining that the time to park at the destination is increasing or decreasing over a monitored time period; and
updating the representation of the isoline in the isoline map in real-time to indicate the increasing or the decreasing of the time to park.

2. The method of claim 1, further comprising:
providing data to present another representation of the at least one alternate mode of transport in the user interface.

3. The method of claim 1, further comprising:
initiating a computation or a presentation of the alternate mode of transport, an alternate route, or a combination thereof based on determining that the time to park at the destination is increasing over a monitored time period, and wherein the real-time parking information within the geographic area surrounding the destination includes on street parking locations and off street parking locations.

4. The method of claim 3, wherein the computation or the presentation of the alternate mode of transport is initiated based on determining that the time to park has increased to a threshold value.

5. The method of claim 3, wherein the alternate mode of transport is associated with a mobility hub.

6. The method of claim 3, wherein the alternate mode of transport includes a shared vehicle, a public transport, or a combination thereof.

7. The method of claim 1, further comprising:
initiating a presentation of a recommendation to continue to the destination to find a parking space based on determining that the time to park at the destination is decreasing over a monitored time period.

8. The method of claim 1, wherein the time to park is further computed based on at least one of:
historical parking information;
a count of vehicles searching for parking; and
traffic information.

9. The method of claim 1, further comprising:
computing a time to the destination based at least in part on a travel time to the isoline, the time to park, and a time from a parking space to the destination.

10. An apparatus for providing an isoline map of a travel time on a route leg of an intermodal route to a destination, comprising:
at least one processor; and
at least one memory including computer program code for one or more programs,
the at least one memory and the computer program code configured to, with the at least one processor, cause the apparatus to perform at least the following,
compute the travel time on the route leg of the intermodal route, wherein the route leg is among a plurality of route legs of the intermodal route computed to reach the destination,
compute the time to park at a destination of the intermodal route; wherein the time to park represents an estimated time that is needed for a vehicle to park within a geographic area surrounding the destination; wherein the time to park is computed based on at least real-time parking information; and wherein the time to park is a difference in time between the time of reaching the geographic area surrounding the destination and the time of reaching a parking space within the geographic area surrounding the destination;

determine an isoline that delineates a boundary of a geographic area surrounding the destination that is reachable within the travel time on the route leg;

provide data to generate a user interface depicting a representation of the isoline with respect to the destination in the isoline map;

determine at least one alternate mode of transport that is located beyond the boundary of the geographic area delineated by the isoline and that has an estimated time of arrival less than the time to park, wherein a vehicle position is obtained from one or more location sensors;

determine that the travel time on the route leg is increasing or decreasing over a monitored time period; and update the representation of the isoline in the isoline map in real-time to indicate the increasing or the decreasing of the time to park.

11. The apparatus of claim 10, wherein the apparatus is further caused to:

provide data to present another representation of the at least one alternate mode of transport in the user interface.

12. The apparatus of claim 10, wherein the apparatus is further caused to: initiate a computation or a presentation of the alternate mode of transport, an alternate route, or a combination thereof based on determining that the travel time on the route leg has increased to or beyond a threshold value.

13. The apparatus of claim 10, wherein the route leg is a last route leg of the intermodal route.

14. A non-transitory computer-readable storage medium for providing an isoline map of a time to park at a destination, carrying one or more sequences of one or more instructions which, when executed by one or more processors, cause an apparatus to at least perform the following steps:

computing the time to park at a destination of a navigation route, wherein the time to park represents an estimated time that is needed for a vehicle to park within a geographic area surrounding the destination, wherein the time to park is computed based on at least real-time parking information; and wherein the time to park is a difference in time between the time of reaching the geographic area surrounding the destination and the time of reaching a parking space within the geographic area surrounding the destination;

determining an isoline that delineates a boundary of the geographic area, wherein the isoline indicates an extent of the geographic area in which the time to park applies;

providing data to generate a user interface depicting a representation of the isoline with respect to the destination in the isoline map;

determining at least one alternate mode of transport that is located beyond the boundary of the geographic area delineated by the isoline and that has an estimated time of arrival less than the time to park, wherein the vehicle position is obtained from one or more location sensors;

determining that the time to park at the destination is increasing or decreasing over a monitored time period; and updating the representation of the isoline in the isoline map in real-time to indicate the increasing or the decreasing of the time to park.

15. The non-transitory computer-readable storage medium of claim 14, wherein the apparatus is further caused to perform:

providing data to present another representation of the at least one alternate mode of transport in the user interface.

16. The non-transitory computer-readable storage medium of claim 14, wherein the apparatus is further caused to perform:

initiating a computation or a presentation of the alternate mode of transport, an alternate route, or a combination thereof based on determining that the time to park at the destination is increasing over a monitored time period, and wherein the real-time parking information within the geographic area surrounding the destination includes on street parking locations and off street parking locations.

17. The non-transitory computer-readable storage medium of claim 16, wherein the computation or the presentation of the alternate mode of transport is initiated based on determining that the time to park has increased to a threshold value.

* * * * *